(12) United States Patent
Kinashi

(10) Patent No.: US 12,722,421 B2
(45) Date of Patent: Sep. 1, 2026

(54) HUB ASSEMBLY FOR HUMAN POWERED VEHICLE

(71) Applicant: SHIMANO INC., Sakai City (JP)

(72) Inventor: Kosuke Kinashi, Sakai City (JP)

(73) Assignee: SHIMANO INC., Sakai (JP)

( * ) Notice: Subject to any disclaimer, the term of this patent is extended or adjusted under 35 U.S.C. 154(b) by 296 days.

(21) Appl. No.: 18/475,186

(22) Filed: Sep. 26, 2023

(65) Prior Publication Data

US 2025/0100328 A1 Mar. 27, 2025

(51) Int. Cl.

| | |
|---|---|
| ***B60B 27/02*** | (2006.01) |
| ***B60B 27/04*** | (2006.01) |
| ***F16D 41/36*** | (2006.01) |

(52) U.S. Cl.
CPC .......... *B60B 27/023* (2013.01); *B60B 27/047* (2013.01); *F16D 41/36* (2013.01)

(58) Field of Classification Search
CPC . B60B 27/047; B60B 27/023; B60B 27/0078; F16D 41/36
See application file for complete search history.

(56) References Cited

U.S. PATENT DOCUMENTS

| | | | | |
|---|---|---|---|---|
| 6,260,681 B1 * | 7/2001 | Chen | F16D 41/28 192/64 |
| 7,731,428 B2 | 6/2010 | Kuan | |
| 8,312,976 B2 | 11/2012 | French | |
| 2003/0198418 A1 | 10/2003 | Chen | |
| 2005/0139444 A1 * | 6/2005 | Kanehisa | B60B 27/047 192/64 |
| 2014/0265531 A1 * | 9/2014 | Chen | B60B 27/023 301/6.5 |
| 2017/0096029 A1 | 4/2017 | Fujita et al. | |
| 2017/0232791 A1 | 8/2017 | Fujita et al. | |
| 2024/0253393 A1 * | 8/2024 | Nakajima | B60B 27/047 |

FOREIGN PATENT DOCUMENTS

| | | | |
|---|---|---|---|
| DE | 10335172 A1 * | 2/2005 | B60B 27/047 |
| DE | 102007026821 A1 * | 12/2008 | B60B 27/047 |
| EP | 2777945 A2 | 9/2014 | |

* cited by examiner

*Primary Examiner* — Kip T Kotter
(74) *Attorney, Agent, or Firm* — MORI & WARD, LLP

(57) ABSTRACT

A hub assembly comprises a hub axle, a hub shell, a sprocket support body, a first bearing unit, a second bearing unit, and a sleeve. The sleeve includes a first abutment portion and a second abutment portion. The first abutment portion abuts the first inner race. The second abutment portion abuts the second inner race in a radial direction.

18 Claims, 14 Drawing Sheets

A1
D1
12C1
12E
16
12X
24
10
29A
22
12C
28
20
12G
CP
12B
12
AL
14
12D
12H
26
12Y
12F
12D1

10
79
70
80
82
46
49
A1
16
36
38A
38
34A
34
36A
37
37A
44
54
30
28
52
50
32
60
14
47
48
D1
D11
D12
D4
CP

HUB ASSEMBLY FOR HUMAN POWERED VEHICLE

BACKGROUND

Technical Field

The present invention relates to a hub assembly of a human powered vehicle.

Background Information

A human powered vehicle includes a hub assembly. The hub assembly includes a rotational member and at least two bearing units configured to rotatably support the rotational member. One of objects of the present disclosure is to correctly position at least two bearing units.

SUMMARY

In accordance with a first aspect of the present invention, a hub assembly for a human powered vehicle comprises a hub axle, a hub shell, a sprocket support body, a first bearing unit, a second bearing unit, and a sleeve. The hub axle has a center axis defining an axial direction, a radial direction and a circumferential direction. The hub shell is rotatably mounted on the hub axle to rotate about the center axis. The sprocket support body is rotatably mounted on the hub axle to rotate about the center axis. The sprocket support body is configured to support at least one sprocket. The first bearing unit is disposed between the hub axle and the hub shell in the radial direction. The second bearing unit is disposed between the hub axle and the sprocket support body in the radial direction. The sleeve is mounted on the hub axle and extending in the axial direction. The sleeve is contactable with the hub axle in the radial direction. The first bearing unit includes a first inner race coupled to the hub axle, a first outer race coupled to the hub shell, and at least two first rolling members disposed between the first inner race and the first outer race in the radial direction. The second bearing unit includes a second inner race coupled to the hub axle, a second outer race coupled to the sprocket support body, and at least two second rolling members disposed between the second inner race and the second outer race in the radial direction. The sleeve includes a first abutment portion and a second abutment portion. The first abutment portion abuts the first inner race. The second abutment portion abuts the second inner race in the radial direction.

With the hub assembly according to the first aspect, the first abutment portion and the second abutment portion enable the first bearing unit and the second bearing unit to be correctly positioned.

In accordance with a second aspect of the present invention, the hub assembly according to the first aspect is configured so that the first abutment portion of the sleeve abuts the first inner race in the axial direction.

With the hub assembly according to the second aspect, the first abutment portion and the second abutment portion enable the first bearing unit and the second bearing unit to be more correctly positioned.

In accordance with a third aspect of the present invention, the hub assembly according to the first or second aspect further comprises a third bearing unit disposed between the hub axle and the sprocket support body in the radial direction. The third bearing unit includes a third inner race coupled to the hub axle, a third outer race coupled to the sprocket support body, and at least two third rolling members disposed between the third inner race and the third outer race in the radial direction. The sleeve further comprises a third abutment portion abutting the third inner race.

With the hub assembly according to the third aspect, the first abutment portion, the second abutment portion, and the third abutment portion enable the first bearing unit, the second bearing unit, and the third bearing unit to be correctly positioned.

In accordance with a fourth aspect of the present invention, the hub assembly according to the third aspect is configured so that the third abutment portion of the sleeve abuts the third inner race in the axial direction.

With the hub assembly according to the fourth aspect, the first abutment portion, the second abutment portion, and the third abutment portion enable the first bearing unit, the second bearing unit, and the third bearing unit to be more correctly positioned.

In accordance with a fifth aspect of the present invention, the hub assembly according to any one of the first to fourth aspects is configured so that the first abutment portion is at least partially positioned radially outwardly from the second abutment portion in the radial direction.

With the hub assembly according to the fifth aspect, the first abutment portion and the second abutment portion enable the first bearing unit and the second bearing unit to be more correctly positioned.

In accordance with a sixth aspect of the present invention, the hub assembly according to the third or fourth aspect is configured so that the sleeve includes a first axial end and a second axial end opposite to the first axial end in the axial direction. The first axial end includes the first abutment portion. The second axial end includes the third abutment portion.

With the hub assembly according to the sixth aspect, the first abutment portion and the second abutment portion enable the first bearing unit and the second bearing unit to be more correctly positioned.

In accordance with a seventh aspect of the present invention, the hub assembly according to the sixth aspect is configured so that the first axial end is positioned closer to an axial center plane of the hub assembly than the second axial end in the axial direction.

With the hub assembly according to the seventh aspect, the first abutment portion and the second abutment portion enable the first bearing unit and the second bearing unit to be more correctly positioned.

In accordance with an eighth aspect of the present invention, the hub assembly according to any one of the first to seventh aspects is configured so that the sleeve is made of a metallic material.

With the hub assembly according to the eighth aspect, it is possible to improve rigidity of the sleeve.

In accordance with a ninth aspect of the present invention, the hub assembly according to any one of the first to eighth aspects further comprises a one-way clutch structure disposed radially outwardly from the second bearing unit in the radial direction.

With the hub assembly according to the ninth aspect, it is possible to utilize a space provided radially outwardly from the second bearing unit as a place where the one-way clutch structure is provided. Thus, it is possible to efficiently arrange the second bearing unit and the one-way clutch structure.

In accordance with a tenth aspect of the present invention, the hub assembly according to the ninth aspect is configured so that the one-way clutch structure includes a first ratchet member and a second ratchet member. The first ratchet member is configured to engage with one of the hub shell and the sprocket support body. The second ratchet member is configured to engage with the other of the hub shell and the sprocket support body. One of the first ratchet member and the second ratchet member is configured to be movable relative to the other of the first ratchet member and the second ratchet member in the axial direction.

With the hub assembly according to the tenth aspect, it is possible to control the rotation of the hub shell and the sprocket support body during pedaling or coasting using the one-way clutch structure.

In accordance with an eleventh aspect of the present invention, a hub assembly for a human powered vehicle comprises a hub axle, a hub shell, a sprocket support body, an axially-outward bearing unit, an axially-inward bearing unit, and a sleeve. The hub axle has a center axis defining an axial direction, a radial direction and a circumferential direction. The hub shell rotatably is mounted on the hub axle to rotate about the center axis. The sprocket support body is rotatably mounted on the hub axle to rotate about the center axis. The sprocket support body is configured to support at least one sprocket. The axially-outward bearing unit is disposed between the hub axle and the sprocket support body in the radial direction. The axially-inward bearing unit is disposed between the hub axle and the sprocket support body in the radial direction. The axially-inward bearing unit is disposed closer to an axial center plane of the hub assembly in the axial direction than the axially-outward bearing unit. The sleeve is mounted on the hub axle and extends in the axial direction. The sleeve is contactable with the hub axle in the radial direction. The axially-outward bearing unit includes an axially-outward inner race coupled to the hub axle, an axially-outward outer race coupled to the sprocket support body, and at least two axially-outward rolling members disposed between the axially-outward inner race and the axially-outward outer race in the radial direction. The axially-inward bearing unit includes an axially-inward inner race coupled to the hub axle, an axially-inward outer race coupled to the sprocket support body, and at least two axially-inward rolling members disposed between the axially-inward inner race and the axially-inward outer race in the radial direction. The sleeve includes an axial abutment portion and a radial abutment portion. The axial abutment portion abuts the axially-outward inner race in the axial direction. The radial abutment portion abuts the axially-inward inner race in the radial direction. The sleeve is free of radial abutment with the axially-outward inner race with respect to the center axis.

With the hub assembly according to the eleventh aspect, the axial abutment portion and the radial abutment portion enable the axially-outward bearing unit and the axially-inward bearing unit to be correctly positioned.

In accordance with a twelfth aspect of the present invention, the hub assembly according to the eleventh aspect is configured so that the sleeve is made of a metallic material.

With the hub assembly according to the twelfth aspect, it is possible to improve rigidity of the sleeve.

In accordance with a thirteenth aspect of the present invention, the hub assembly according to the eleventh or twelfth aspect further comprises a one-way clutch structure disposed radially outwardly from the axially-inward bearing unit in the radial direction.

With the hub assembly according to the thirteenth aspect, it is possible to utilize a space provided radially outwardly from the axially-inward bearing unit as a place where the one-way clutch structure is provided. Thus, it is possible to efficiently arrange the axially-inward bearing unit and the one-way clutch structure.

In accordance with a fourteenth aspect of the present invention, the hub assembly according to the thirteenth aspect is configured so that the one-way clutch structure includes a first ratchet member and a second ratchet member. The first ratchet member is configured to engage with one of the hub shell and the sprocket support body. The second ratchet member is configured to engage with the other of the hub shell and the sprocket support body. One of the first ratchet member and the second ratchet member is configured to be movable relative to the other of the first ratchet member and the second ratchet member in the axial direction.

With the hub assembly according to the fourteenth aspect, it is possible to control the rotation of the hub shell and the sprocket support body during pedaling or coasting using the one-way clutch structure.

In accordance with a fifteenth aspect of the present invention, a hub assembly for a human powered vehicle comprises a hub axle, a hub shell, a sprocket support body, an axially-outward bearing unit, an axially-inward bearing unit, and a sleeve. The hub axle has a center axis defining an axial direction, a radial direction and a circumferential direction. The hub shell is rotatably mounted on the hub axle to rotate about the center axis. The sprocket support body is rotatably mounted on the hub axle to rotate about the center axis. The sprocket support body is configured to support at least one sprocket. The axially-outward bearing unit is disposed between the hub axle and the sprocket support body in the radial direction. The axially-inward bearing unit is disposed between the hub axle and the sprocket support body in the radial direction. The axially-inward bearing unit is disposed closer to an axial center plane of the hub assembly in the axial direction than the axially-outward bearing unit. The sleeve is mounted on the hub axle and extends in the axial direction. The sleeve is contactable with the hub axle in the radial direction. The axially-outward bearing unit includes an axially-outward inner race coupled to the hub axle, an axially-outward outer race coupled to the sprocket support body, and at least two axially-outward rolling members disposed between the axially-outward inner race and the axially-outward outer race in the radial direction. The axially-inward bearing unit includes an axially-inward inner race coupled to the hub axle, an axially-inward outer race coupled to the sprocket support body, and at least two axially-inward rolling members disposed between the axially-inward inner race and the axially-inward outer race in the radial direction. The sleeve includes an axial abutment portion and a radial abutment portion. The axial abutment portion abuts the axially-outward inner race in the axial direction. The radial abutment portion abuts the axially-inward inner race in the radial direction. The sleeve is free of axial abutment with the axially-inward inner race with respect to the center axis.

With the hub assembly according to the fifteenth aspect, the axial abutment portion and the radial abutment portion enable the axially-outward bearing unit and the axially-inward bearing unit to be correctly positioned.

In accordance with a sixteenth aspect of the present invention, the hub assembly according to the fifteenth aspect is configured so that the sleeve is free of radial abutment with the axially-outward inner race with respect to the center axis.

With the hub assembly according to the sixteenth aspect, the axial abutment portion and the radial abutment portion enable the axially-outward bearing unit and the axially-inward bearing unit to be more correctly positioned.

In accordance with a seventeenth aspect of the present invention, the hub assembly according to the fifteenth or sixteenth aspect is configured so that the sleeve is made of a metallic material.

With the hub assembly according to the seventeenth aspect, it is possible to improve rigidity of the sleeve.

In accordance with an eighteenth aspect of the present invention, the hub assembly according to any one of the fifteenth to seventeenth aspects further comprises a one-way clutch structure disposed radially outwardly from the axially-inward bearing unit in the radial direction.

With the hub assembly according to the eighteenth aspect, it is possible to utilize a space provided radially outwardly from the axially-inward bearing unit as a place where the one-way clutch structure is provided. Thus, it is possible to efficiently arrange the axially-inward bearing unit and the one-way clutch structure.

In accordance with a nineteenth aspect of the present invention, the hub assembly according to the eighteenth aspect is configured so that the one-way clutch structure includes a first ratchet member and a second ratchet member. The first ratchet member is configured to engage with one of the hub shell and the sprocket support body. The second ratchet member is configured to engage with the other of the hub shell and the sprocket support body. One of the first ratchet member and the second ratchet member is configured to be movable relative to the other of the first ratchet member and the second ratchet member in the axial direction.

With the hub assembly according to the nineteenth aspect, it is possible to control the rotation of the hub shell and the sprocket support body during pedaling or coasting using the one-way clutch structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
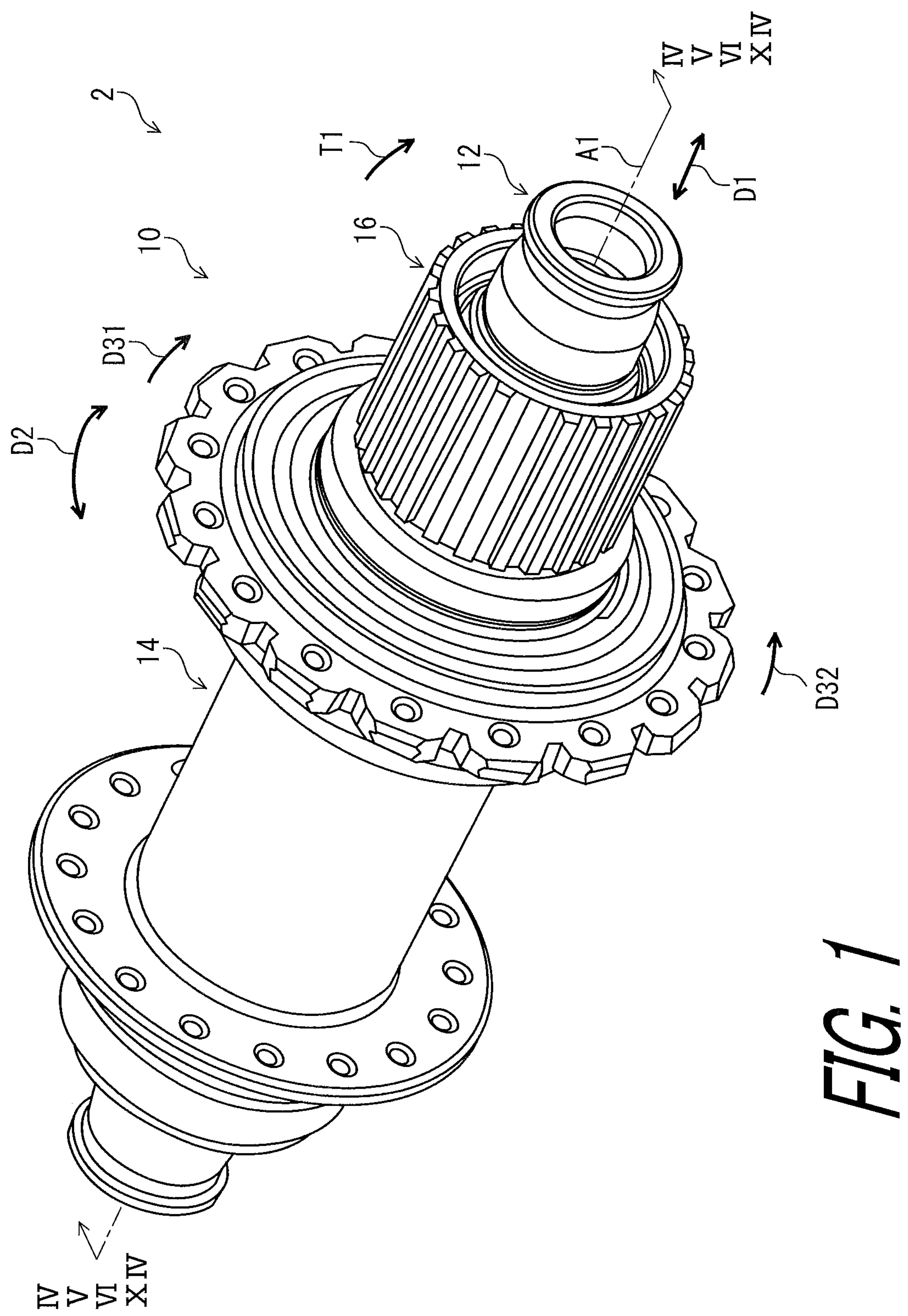
FIG. 1 is a perspective view of a human powered vehicle including a hub assembly in accordance with one of embodiments.

The embodiments will now be described with reference to the accompanying drawings, wherein like reference numerals designate corresponding or identical elements throughout the various drawings.

Figure 2:
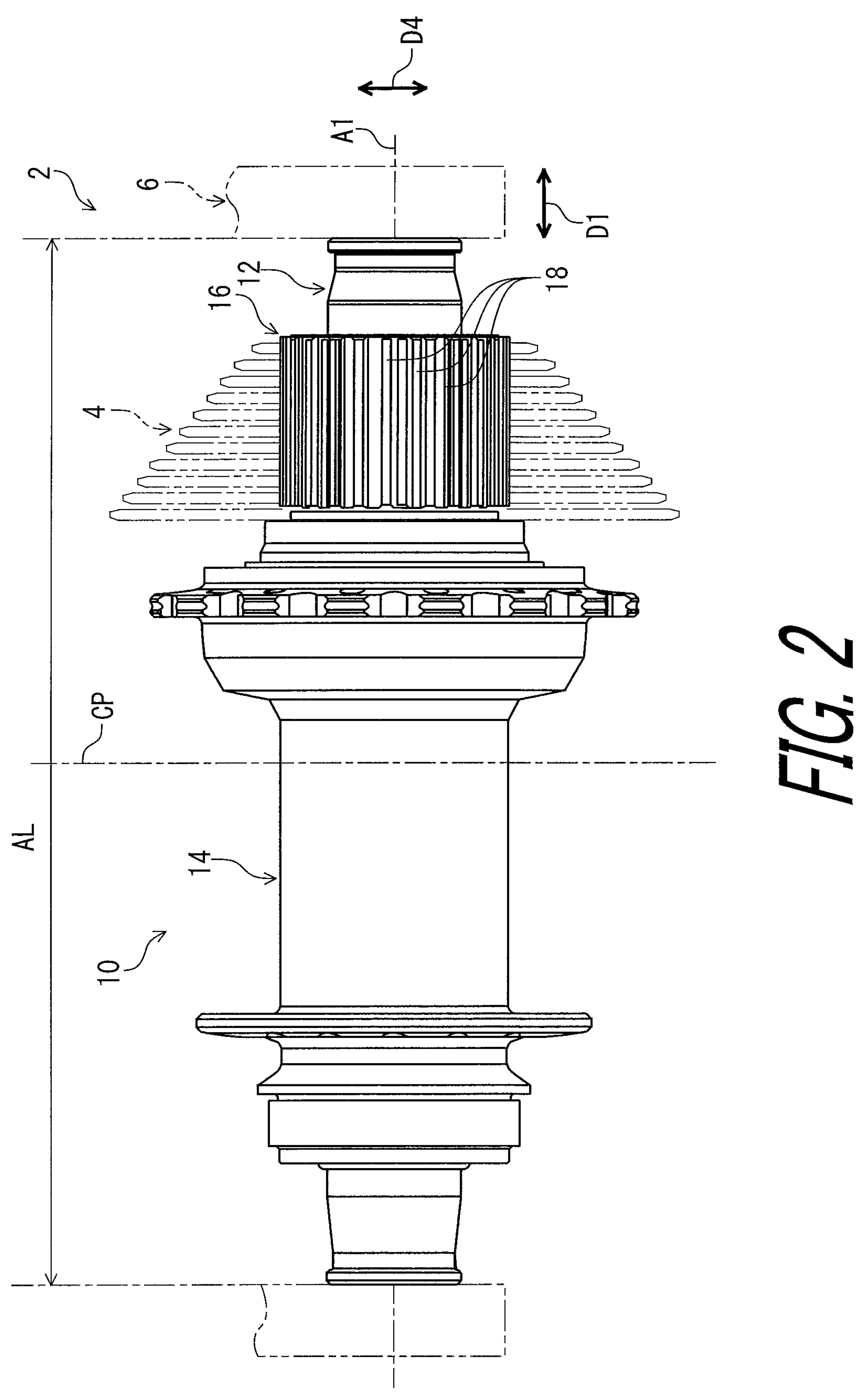
FIG. 2 is a side elevational view of the hub assembly illustrated in FIG. 1.

As seen in FIGS. 1 and 2, a hub assembly 10 for a human powered vehicle 2 comprises a hub axle 12, a hub shell 14, and a sprocket support body 16. The hub axle 12 has a center axis A1. The hub axle 12 extends along the center axis A1. The center axis A1 defines an axial direction D1. The center axis A1 defines a circumferential direction D2. The center axis A1 defines a radial direction D4. The axial direction D1 is defined along the center axis A1. The circumferential direction D2 is defined about the center axis A1. The radial direction D4 is defined perpendicularly to the center axis A1. The hub shell 14 is rotatably mounted on the hub axle 12 to rotate about the center axis A1. The hub shell 14 is rotatably mounted on the hub axle 12 to rotate about the center axis A1. The sprocket support body 16 is rotatably mounted on the hub axle 12 to rotate about the center axis A1. The hub shell 14 is configured to be coupled to at least two spokes of a wheel.

In the present application, the term "human powered vehicle" includes a vehicle to travel with a motive power including at least a human power of a user who rides the vehicle. The human powered vehicle includes a various kind of bicycles such as a mountain bike, a road bike, a city bike, a cargo bike, a hand bike, and a recumbent bike. Furthermore, the human powered vehicle includes an electric bike called as an E-bike. The electric bike includes an electrically assisted bicycle configured to assist propulsion of a vehicle with an electric motor. However, a total number of wheels of the human powered vehicle is not limited to two. For example, the human powered vehicle includes a vehicle having one wheel or three or more wheels. Especially, the human powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human powered vehicle 2 with facing a handlebar or steering. Examples of the user's standard position include a saddle and a seat. Accordingly, these terms, as utilized to describe the hub assembly 10 or other components, should be interpreted relative to the human powered vehicle 2 equipped with the hub assembly 10 or other components as used in an upright riding position on a horizontal surface.

As seen in FIG. 2, the hub axle 12 is configured to be secured to a vehicle body 6 of the human powered vehicle 2 with a hub securing structure. The sprocket support body 16 is configured to support at least one sprocket. The sprocket support body 16 is configured to support a sprocket assembly 4 including at least one sprocket. The sprocket support body 16 is coupled to the sprocket assembly 4 to rotate integrally with the sprocket assembly 4 about the center axis A1. The sprocket support body 16 includes at least two external spline teeth 18. The at least two external spline teeth 18 are configured to engage with at least two internal spline teeth of the sprocket assembly 4.

An axial center plane CP is defined to bisect an axial length AL of the hub assembly 10 in the axial direction D1. The axial center plane CP is perpendicular to the center axis A1.

Figure 3:
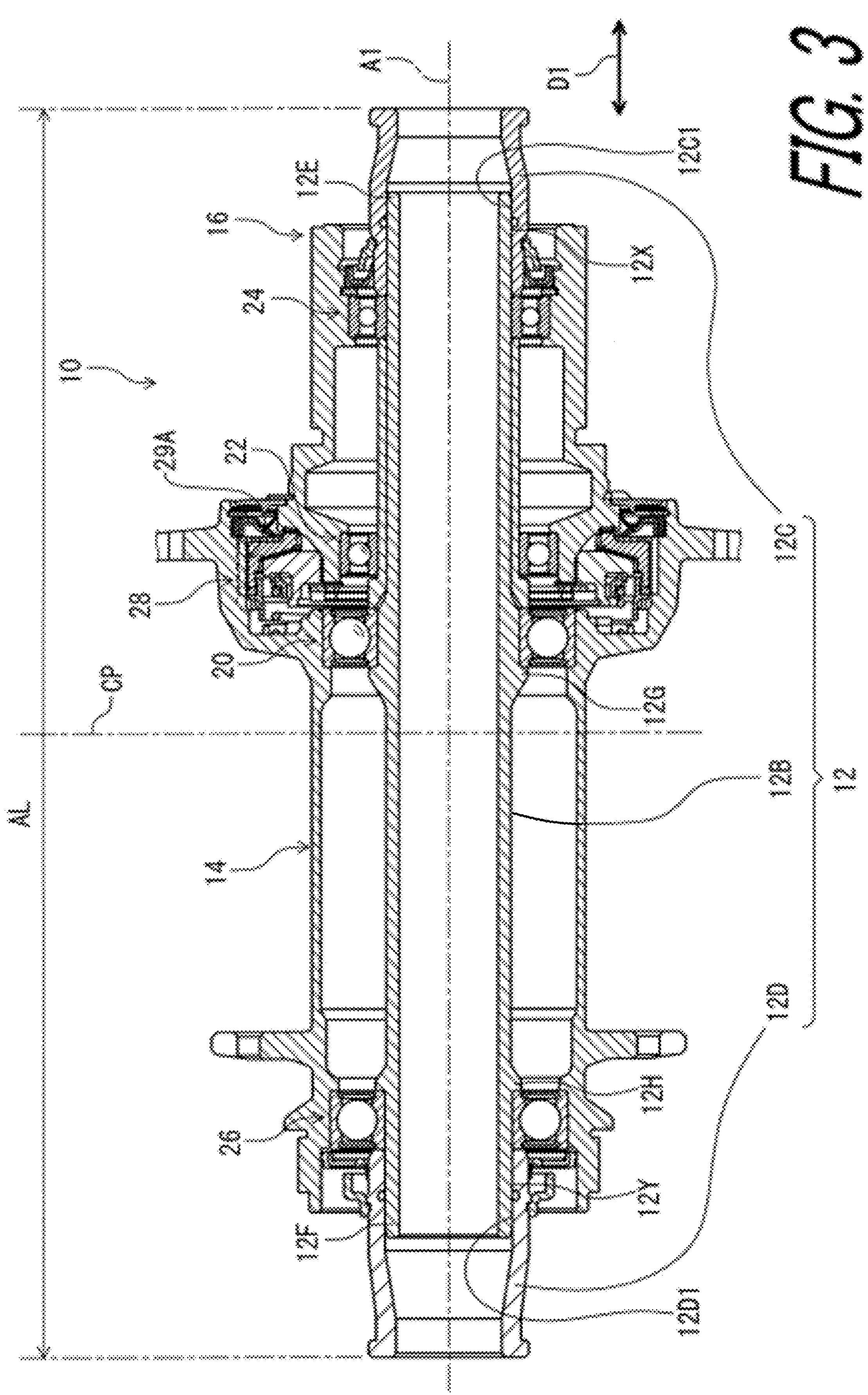
FIG. 3 is a cross-sectional view of the hub assembly taken along line III-III of FIG. 1.

As seen in FIG. 3, the hub assembly 10 for the human powered vehicle 2 comprises a first bearing unit 20. The first bearing unit 20 is disposed between the hub axle 12 and the hub shell 14 in the radial direction D4. The first bearing unit 20 is configured to rotatably support the hub shell 14 relative to the hub axle 12 about the center axis A1.

The hub assembly 10 for the human powered vehicle 2 comprises a second bearing unit 22. The second bearing unit 22 is disposed between the hub axle 12 and the sprocket support body 16 in the radial direction D4. The second bearing unit 22 is configured to rotatably support the sprocket support body 16 relative to the hub axle 12 about the center axis A1.

The hub assembly 10 further comprises a third bearing unit 24. The third bearing unit 24 is disposed between the hub axle 12 and the sprocket support body 16 in the radial direction D4. The third bearing unit 24 is configured to rotatably support the sprocket support body 16 relative to the hub axle 12 about the center axis A1.

The hub assembly 10 for the human powered vehicle 2 comprises a fourth bearing unit 26. The fourth bearing unit 26 is disposed between the hub axle 12 and the hub shell 14 in the radial direction D4. The fourth bearing unit 26 is configured to rotatably support the hub shell 14 relative to the hub axle 12 about the center axis A1.

The first bearing unit 20 is disposed closer to the axial center plane CP of the hub assembly 10 in the axial direction D1 than the second bearing unit 22. The second bearing unit 22 is disposed closer to the axial center plane CP of the hub assembly 10 in the axial direction D1 than the third bearing unit 24. The second bearing unit 22 is provided between the first bearing unit 20 and the third bearing unit 24 in the axial direction D1.

The second bearing unit 22 can also be referred to as an axially-inward bearing unit 22. The third bearing unit 24 can also be referred to as an axially-outward bearing unit 24. Namely, the hub assembly 10 for the human powered vehicle 2 comprises the axially-inward bearing unit 22. The hub assembly 10 for the human powered vehicle 2 comprises the axially-outward bearing unit 24. The axially-inward bearing unit 22 is disposed between the hub axle 12 and the sprocket support body 16 in the radial direction D4. The axially-outward bearing unit 24 is disposed between the hub axle 12 and the sprocket support body 16 in the radial direction D4. The axially-inward bearing unit 22 is disposed closer to the axial center plane CP of the hub assembly 10 in the axial direction D1 than the axially-outward bearing unit 24.

Figure 4:
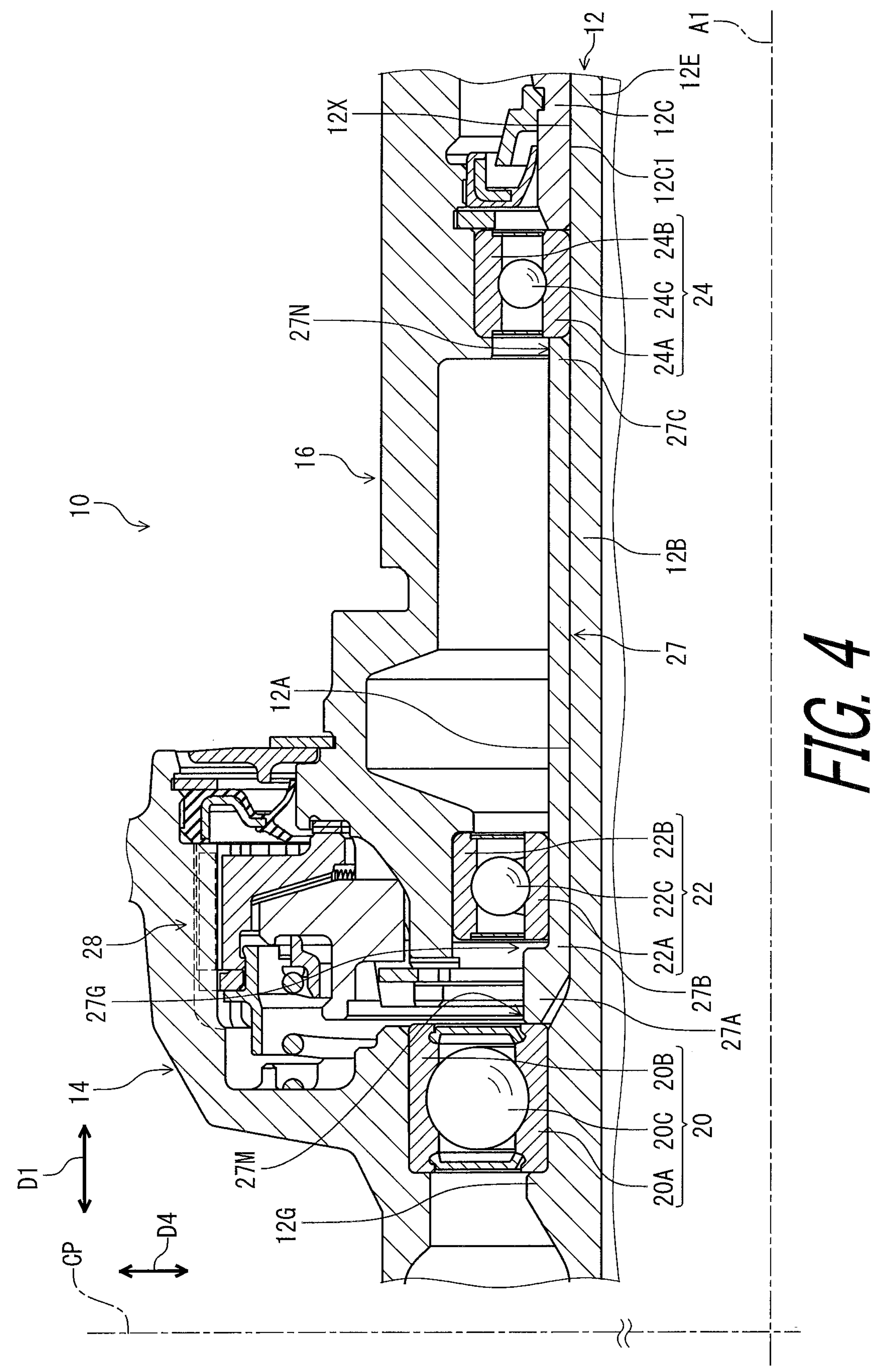
FIG. 4 is a partial cross-sectional view of the hub assembly taken along line IV-IV of FIG. 1.

As seen in FIG. 4, the first bearing unit 20 includes a first inner race 20A, a first outer race 20B, and at least two first rolling members 20C. The first inner race 20A is coupled to the hub axle 12. The first outer race 20B is coupled to the hub shell 14. The at least two first rolling members 20C are disposed between the first inner race 20A and the first outer race 20B in the radial direction D4. For example, the first rolling member 20C includes a bearing such as a ball.

The second bearing unit 22 includes a second inner race 22A, a second outer race 22B, and at least two second rolling members 22C. The second inner race 22A is coupled to the hub axle 12. The second outer race 22B is coupled to the sprocket support body 16. The at least two second rolling members 22C are disposed between the second inner race 22A and the second outer race 22B in the radial direction D4. For example, the second rolling member 22C includes a bearing such as a ball.

The second inner race 22A can also be referred to as an axially-inward inner race 22A. The second outer race 22B can also be referred to as an axially-inward outer race 22B. The second rolling member 22C can also be referred to as an axially-inward rolling member 22C. Namely, the axially-inward bearing unit 22 includes the axially-inward inner race 22A, the axially-inward outer race 22B, and the at least two axially-inward rolling members 22C. The axially-inward inner race 22A is coupled to the hub axle 12. The axially-inward outer race 22B is coupled to the sprocket support body 16. The at least two axially-inward rolling members 22C are disposed between the axially-inward inner race 22A and the axially-inward outer race 22B in the radial direction D4.

The third bearing unit 24 includes a third inner race 24A, a third outer race 24B, and at least two third rolling members 24C. The third inner race 24A is coupled to the hub axle 12. The third outer race 24B is coupled to the sprocket support body 16. The at least two third rolling members 24C are disposed between the third inner race 24A and the third outer race 24B in the radial direction D4. For example, the third rolling member 24C includes a bearing such as a ball.

The third inner race 24A can also be referred to as an axially-outward inner race 24A. The third outer race 24B can also be referred to as an axially-outward outer race 24B. The third rolling member 24C can also be referred to as an axially-outward rolling member 24C. Namely, the axially-outward bearing unit 24 includes an axially-outward inner race 24A, an axially-outward outer race 24B, and at least two axially-outward rolling members 24C. The axially-outward inner race 24A is coupled to the hub axle 12. The axially-outward outer race 24B is coupled to the sprocket support body 16. The at least two axially-outward rolling members 24C are disposed between the axially-outward inner race 24A and the axially-outward outer race 24B in the radial direction D4.

Figure 5:
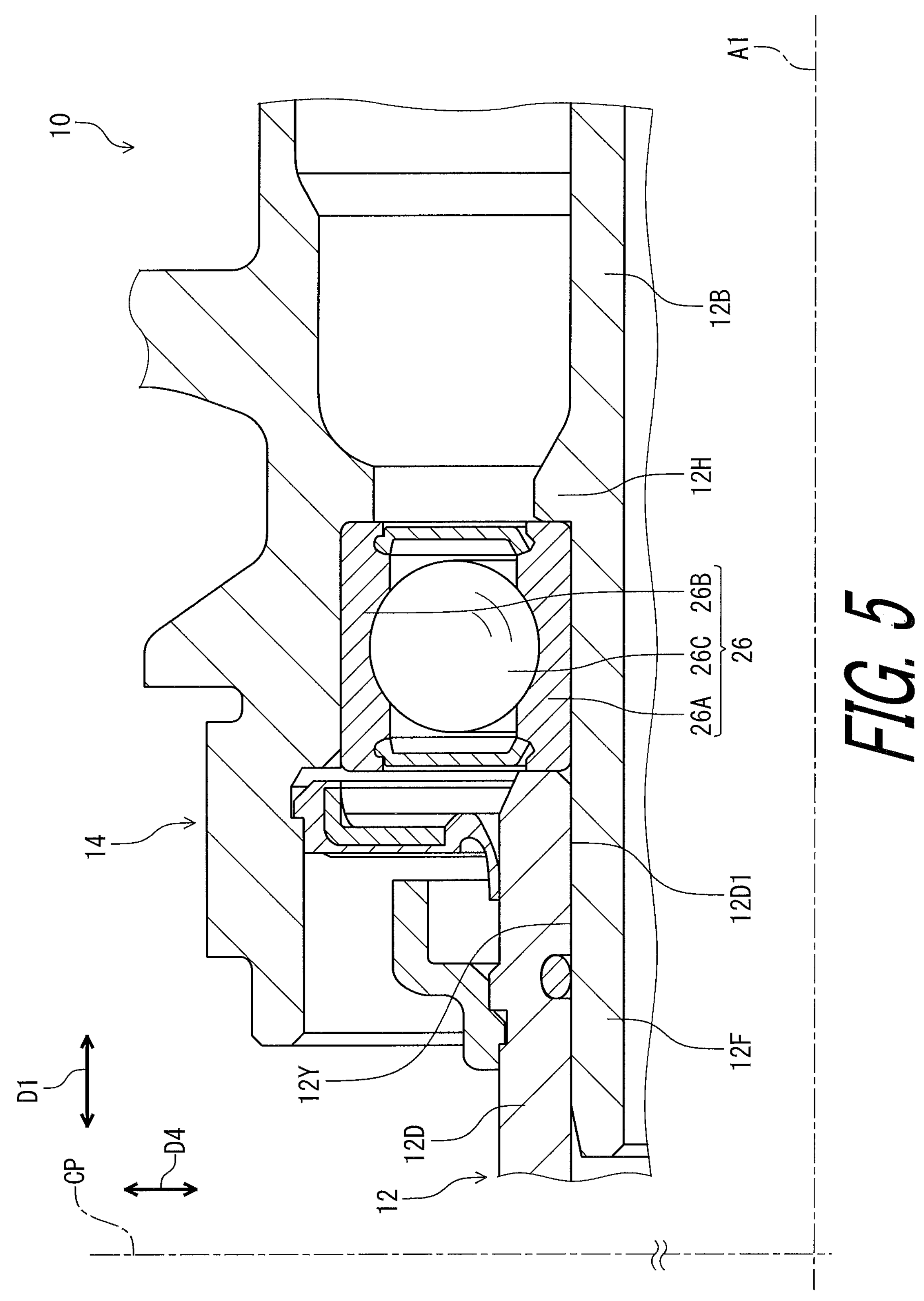
FIG. 5 is a partial cross-sectional view of the hub assembly taken along line V-V of FIG. 1.

As seen in FIG. 5, the fourth bearing unit 26 includes a fourth inner race 26A, a fourth outer race 26B, and at least two fourth rolling members 26C. The fourth inner race 26A is coupled to the hub axle 12. The fourth outer race 26B is coupled to the hub shell 14. The at least two fourth rolling members 26C are disposed between the fourth inner race 26A and the fourth outer race 26B in the radial direction D4. For example, the fourth rolling member 26C includes a bearing such as a ball.

As seen in FIG. 3, the hub axle 12 includes an axle body 12B, a first coupling member 12C, and a second coupling member 12D. The axle body 12B includes a first axle end 12E and a second axle end 12F. The axle body 12B extends between the first axle end 12E and the second axle end 12F. The first coupling member 12C is coupled to the first axle end 12E of the axle body 12B. The second coupling member 12D is coupled to the second axle end 12F of the axle body 12B.

The axle body 12B includes a first threaded portion 12X and a second threaded portion 12Y. The first coupling member 12C includes a first threaded hole 12C1. The first threaded hole 12C1 is engaged with the first threaded portion 12X in a state where the first coupling member 12C is coupled to the first axle end 12E of the axle body 12B. The second coupling member 12D includes a second threaded hole 12D1. The second threaded hole 12D1 is engaged with the second threaded portion 12Y in a state where the second coupling member 12D is coupled to the second axle end 12F of the axle body 12B.

The axle body 12B includes a first stopper 12G and a second stopper 12H. The first stopper 12G is contactable with the first bearing unit 20. The second stopper 12H is contactable with the fourth bearing unit 26. The first bearing unit 20 is held between the first stopper 12G and the first coupling member 12C. The fourth bearing unit 26 is held between the second stopper 12H and the second coupling member 12D.

As seen in FIG. 4, the hub assembly 10 for the human powered vehicle 2 comprises a sleeve 27. The sleeve 27 is mounted on the hub axle 12. The sleeve 27 is mounted on the axle body 12B of the hub axle 12. The sleeve 27 extends in the axial direction D1. The sleeve 27 is contactable with the hub axle 12 in the radial direction D4. The sleeve 27 has a tubular shape. The sleeve 27 is in contact with an outer peripheral surface 12A of the hub axle 12. The first bearing unit 20, the sleeve 27, and the third bearing unit 24 are held between the first stopper 12G and the first coupling member 12C.

The sleeve 27 includes a first abutment portion 27A. The first abutment portion 27A abuts the first inner race 20A. The first abutment portion 27A of the sleeve 27 abuts the first inner race 20A in the axial direction D1. The first abutment portion 27A is in contact with the first inner race 20A in the axial direction D1. The sleeve 27 is free of radial abutment with the first inner race 20A. The first inner race 20A is held between the first stopper 12G and the first abutment portion 27A in the axial direction D1.

The sleeve 27 includes a second abutment portion 27B. The second abutment portion 27B abuts the second inner race 22A in the radial direction D4. The second abutment portion 27B is in contact with the second inner race 22A in the radial direction D4. The second abutment portion 27B can also be referred to as a radial abutment portion 27B. Namely, the sleeve 27 includes the radial abutment portion 27B. The radial abutment portion 27B abuts the axially-inward inner race 22A in the radial direction D4. The radial abutment portion 27B is in contact with the axially-inward inner race 22A in the radial direction D4.

Figure 6:
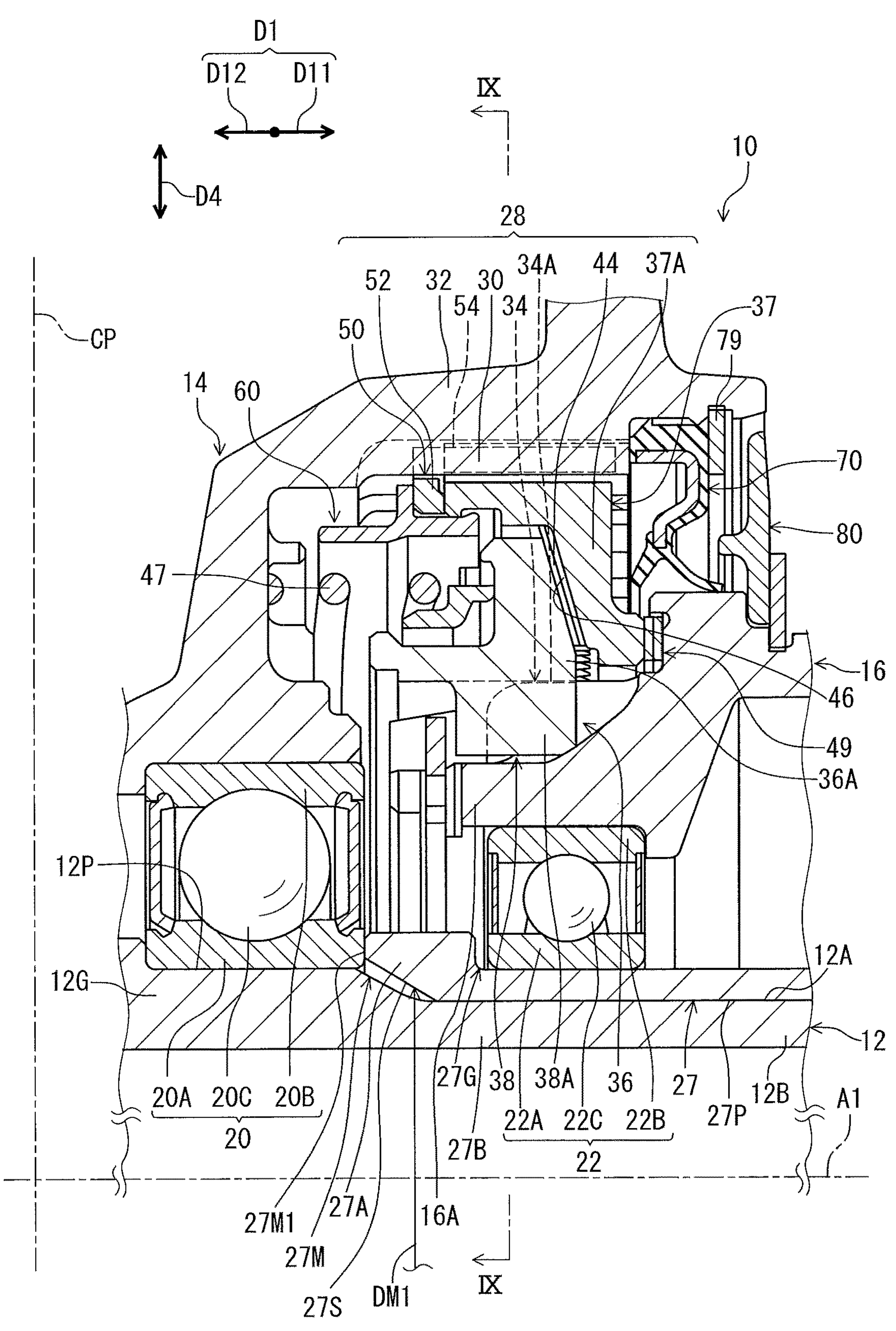
FIG. 6 is a partial cross-sectional view of the hub assembly taken along line VI-VI of FIG. 1.

As seen in FIG. 6, the sleeve 27 is free of axial abutment with the axially-inward inner race 22A with respect to the center axis A1. The sleeve 27 is free of abutting the axially-inward inner race 22A in the radial direction D4. The sleeve 27 is free of contacting the axially-inward inner race 22A in the radial direction D4. A gap 27G is provided between the second inner race 22A and the sleeve 27 in the axial direction D1. The first abutment portion 27A is free of axial abutment with the axially-inward inner race 22A with respect to the center axis A1. The first abutment portion 27A is free of abutting the axially-inward inner race 22A in the radial direction D4. The first abutment portion 27A is free of contacting the axially-inward inner race 22A in the radial direction D4. The gap 27G is provided between the second inner race 22A and the first abutment portion 27A in the axial direction D1.

In the present embodiment, the first abutment portion 27A is at least partially positioned radially outwardly from the second abutment portion 27B in the radial direction D4. However, the positional relationship between the first abutment portion 27A and the second abutment portion 27B is not limited to the illustrated embodiment.

As seen in FIG. 4, the sleeve 27 further comprises a third abutment portion 27C. The third abutment portion 27C abuts the third inner race 24A. The third abutment portion 27C of the sleeve 27 abuts the third inner race 24A in the axial direction D1. The third abutment portion 27C of the sleeve 27 is in contact with the third inner race 24A in the axial direction D1. The third abutment portion 27C can also be referred to as an axial abutment portion 27C. Namely, the sleeve 27 includes an axial abutment portion 27C. The axial abutment portion 27C abuts the axially-outward inner race 24A in the axial direction D1. The axial abutment portion 27C is in contact with the axially-outward inner race 24A in the axial direction D1. The third inner race 24A is held between the third abutment portion 27C and the first coupling member 12C in the axial direction D1.

The sleeve 27 is free of radial abutment with the axially-outward inner race 24A with respect to the center axis A1. The sleeve 27 is free of abutting the third inner race 24A in the radial direction D4. The sleeve 27 is free of contacting the third inner race 24A in the radial direction D4. The third abutment portion 27C is free of radial abutment with the axially-outward inner race 24A with respect to the center axis A1. The third abutment portion 27C is free of abutting the third inner race 24A in the radial direction D4. The third abutment portion 27C is free of contacting the third inner race 24A in the radial direction D4. The third inner race 24A is in contact with the outer peripheral surface 12A of the hub axle 12.

The sleeve 27 includes a first axial end 27M and a second axial end 27N opposite to the first axial end 27M in the axial direction D1. The sleeve 27 extends between the first axial end 27M and the second axial end 27N in the axial direction D1. The first axial end 27M is positioned closer to the axial center plane CP of the hub assembly 10 than the second axial end 27N in the axial direction D1.

The first axial end 27M includes the first abutment portion 27A. The second axial end 27N includes the third abutment portion 27C. Namely, the sleeve 27 extends between the first abutment portion 27A and the third abutment portion 27C in the axial direction D1.

The first axial end 27M includes an end surface 27M1. The sleeve 27 includes an inner peripheral surface 27P. The end surface 27M1 is in contact with the first inner race 20A of the first bearing unit 20 in the axial direction D1. The inner peripheral surface 27P is in contact with the outer peripheral surface 12A of the hub axle 12. The first axial end 27M includes an inclined surface 27S. The inclined surface 27S is non-perpendicular to and non-parallel to the axial direction D1. The inclined surface 27S has an inner diameter DM1 radially defined. The inner diameter DM1 decreases from the end surface 27M1 to the inner peripheral surface 27P. However, the inclined surface 27S can be omitted from the first axial end 27M if needed or desired.

The hub axle 12 includes an additional outer peripheral surface 12P. An outer diameter of the additional outer peripheral surface 12P is greater than an outer diameter of the outer peripheral surface 12A. The first inner race 20A of the first bearing unit 20 is in contact with the additional outer peripheral surface 12P. The end surface 27M1 of the first axial end 27M is at least partially provided radially outwardly from the additional outer peripheral surface 12P of the hub axle 12.

In the present embodiment, the sleeve 27 is made of a metallic material. For example, the sleeve 27 is made of one of aluminum, iron, and titanium. However, the sleeve 27 can be made of a non-metallic material if needed or desired. The sleeve 27 can be made of a metallic material other than aluminum if needed or desired.

Figure 7:
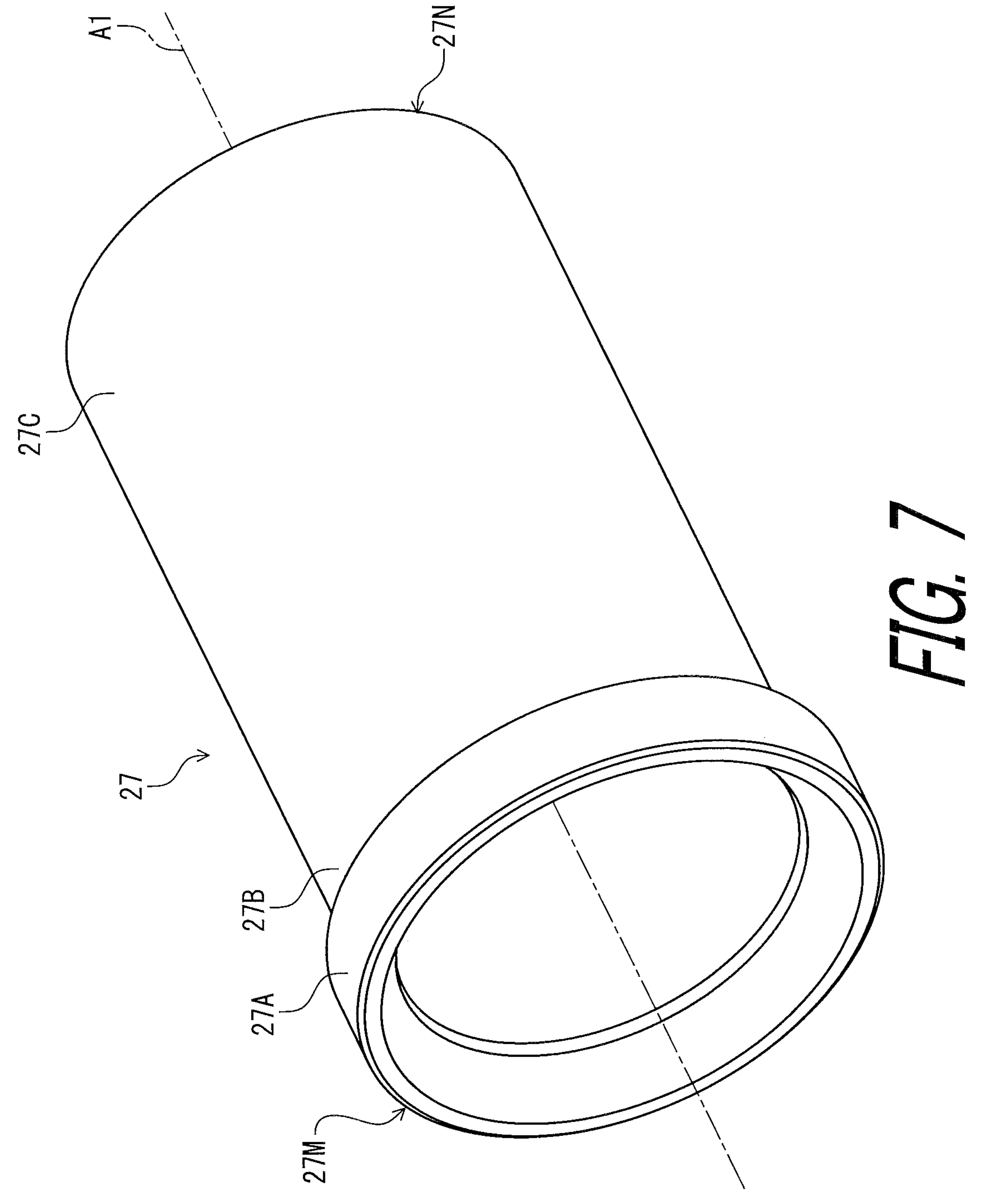
FIG. 7 is a perspective view of a sleave of the hub assembly illustrated in FIG. 1.

As seen in FIG. 7, the first abutment portion 27A has an annular shape. The second abutment portion 27B has an annular shape. The third abutment portion 27C has an annular shape. However, the first abutment portion 27A can have a shape other than the annular shape if needed or desired. The second abutment portion 27B can have a shape other than the annular shape if needed or desired. The third abutment portion 27C can have a shape other than the annular shape if needed or desired.

As seen in FIG. 6, the hub assembly 10 further comprises a one-way clutch structure 28. The one-way clutch structure 28 is disposed radially outwardly from the second bearing unit 22 in the radial direction D4. The one-way clutch structure 28 is disposed radially outwardly from the axially-inward bearing unit 22 in the radial direction D4. However, the positional relationship between the one-way clutch structure 28 and the second bearing unit 22 is not limited to the illustrated embodiment.

The one-way clutch structure 28 is disposed radially outwardly from the sleeve 27 in the radial direction D4. The one-way clutch structure 28 is disposed radially outwardly from the first abutment portion 27A in the radial direction D4. The one-way clutch structure 28 is disposed radially outwardly from the second abutment portion 27B in the radial direction D4. The one-way clutch structure 28 is disposed radially outwardly from the third abutment portion 27C in the radial direction D4.

Figure 8:
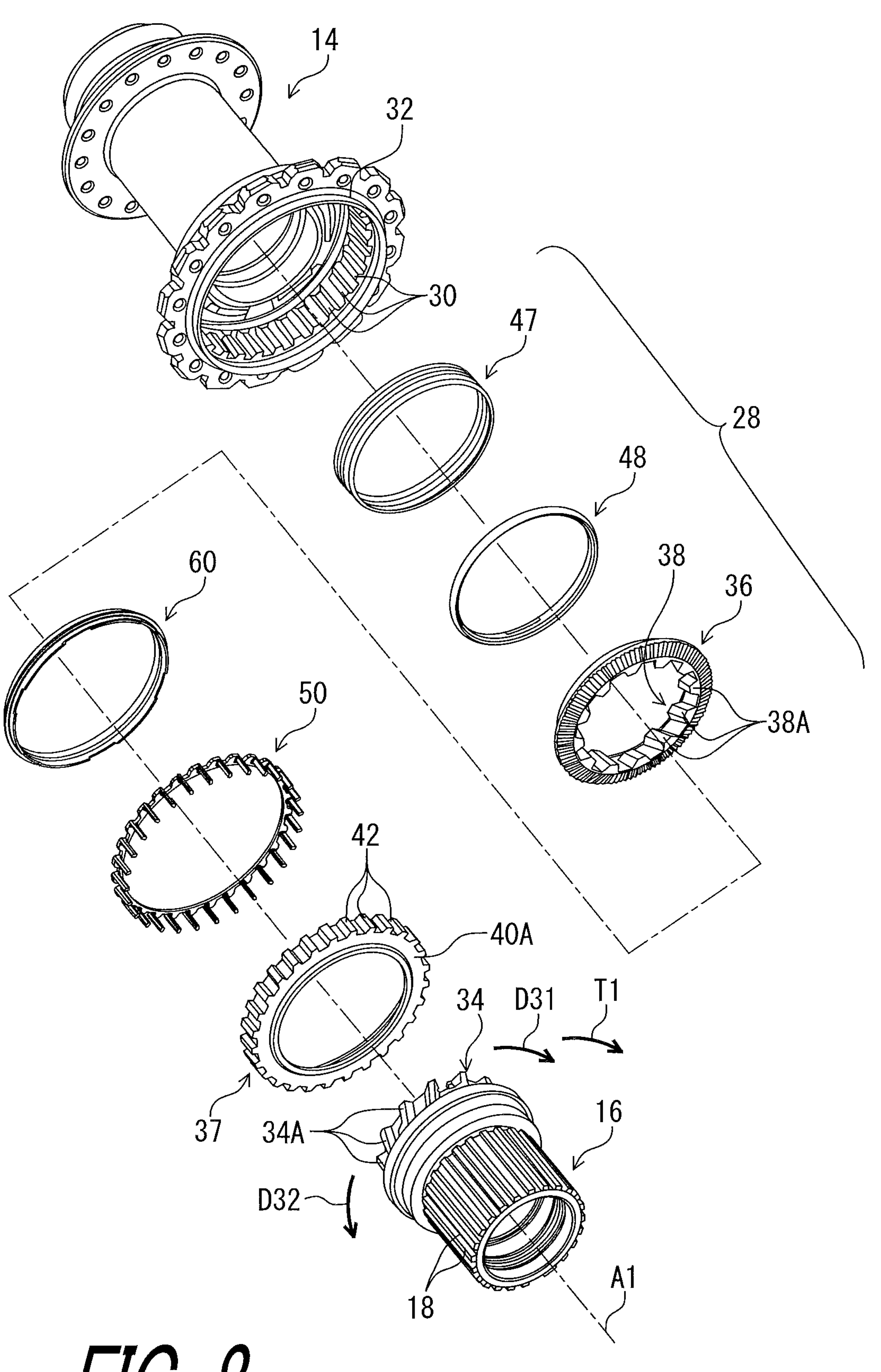
FIG. 8 is an exploded perspective view of a part of the hub assembly illustrated in FIG. 1.

As seen in FIG. 8, the one-way clutch structure 28 is configured to restrict the sprocket support body 16 from rotating relative to the hub shell 14 about the center axis A1 in a first rotational direction D31. Thus, pedaling torque T1 is transmitted from the sprocket support body 16 to the hub shell 14 in the first rotational direction D31 in a case where the sprocket support body 16 receives the pedaling torque T1 in the first rotational direction D31. The one-way clutch structure 28 is configured to allow the sprocket support body 16 to rotate relative to the hub shell 14 about the center axis A1 in a second rotational direction D32. Namely, the one-way clutch structure 28 is configured to allow the hub shell 14 to rotate relative to the sprocket support body 16 about the center axis A1 in the first rotational direction D31. The first rotational direction D31 is an opposite direction of the second rotational direction D32.

As seen in FIG. 8, the hub shell 14 includes at least one first tooth 30. The hub shell 14 includes a tubular portion 32. In the present embodiment, the hub shell 14 includes at least two first teeth 30. However, the total number of the at least one first tooth 30 is not limited to the illustrated embodiment.

The sprocket support body 16 includes a first spline 34. The first spline 34 includes at least one first spline tooth 34A. In the present embodiment, the first spline 34 includes at least two first spline teeth 34A. However, the total number of the at least one first spline tooth 34A is not limited to the illustrated embodiment.

Figure 9:
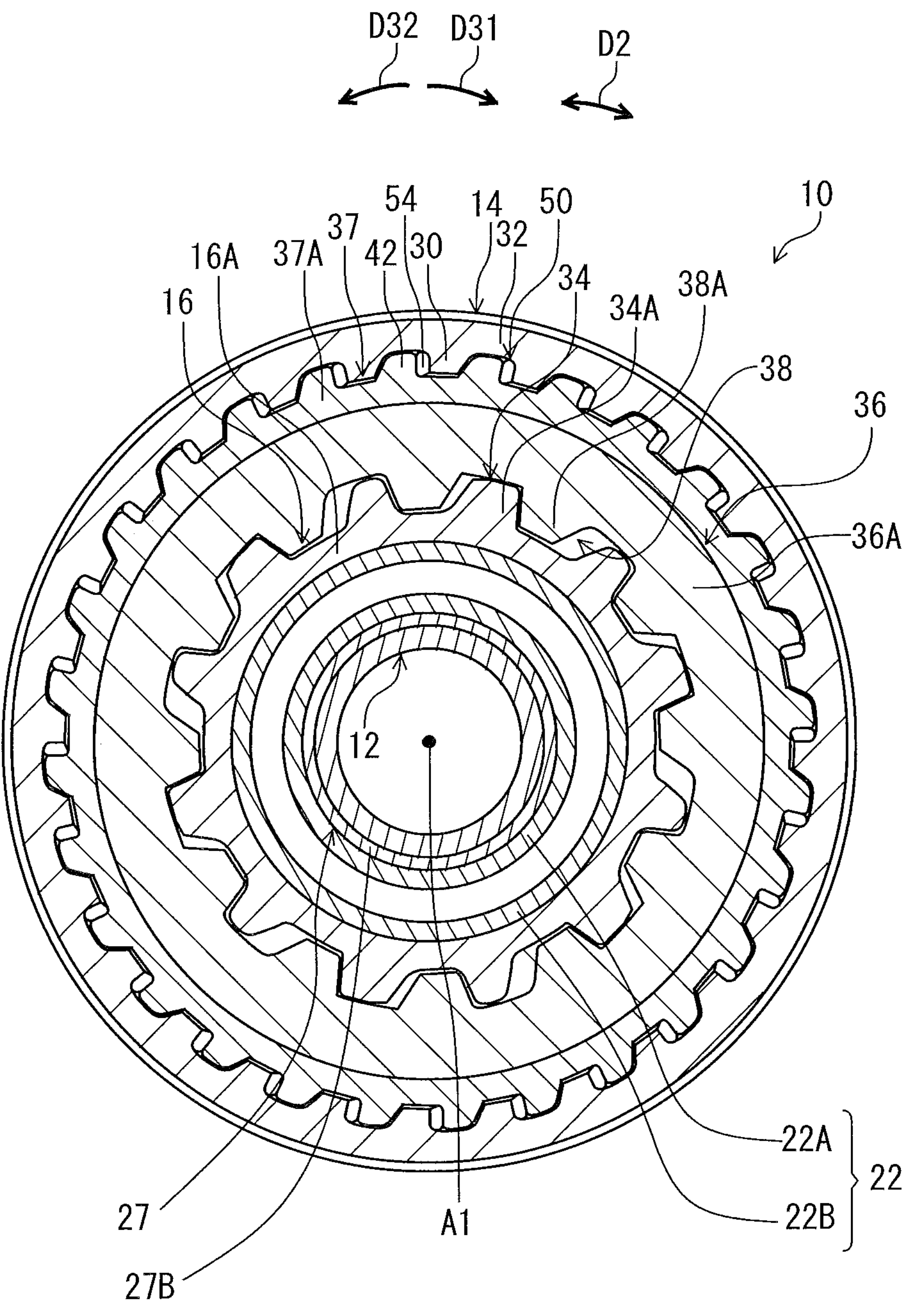
FIG. 9 is a cross-sectional view of the hub assembly taken along line IX-IX of FIG. 6.

As seen in FIG. 9, the at least one first tooth 30 extends radially inwardly from the tubular portion 32. The at least two first teeth 30 extend radially inwardly from the tubular portion 32. The sprocket support body 16 includes a base portion 16A. For example, the base portion 16A has an annular shape. The first spline 34 is provided radially outwardly of the base portion 16A. The at least one first spline tooth 34A extends radially outwardly of the base portion 16A. The at least two first spline teeth 34A extend radially outwardly of the base portion 16A. The shape of the base portion 16A is not limited to the annular shape.

As seen in FIG. 8, the one-way clutch structure 28 includes a first ratchet member 36 and a second ratchet member 37. The first ratchet member 36 is configured to engage with one of the hub shell 14 and the sprocket support body 16. The second ratchet member 37 is configured to engage with the other of the hub shell 14 and the sprocket support body 16. One of the first ratchet member 36 and the second ratchet member 37 is configured to be movable relative to the other of the first ratchet member 36 and the second ratchet member 37 in the axial direction D1. In the present embodiment, the first ratchet member 36 is configured to engage with the sprocket support body 16. The second ratchet member 37 is configured to engage with the hub shell 14. However, the first ratchet member 36 can be configured to engage with the hub shell 14 if needed or desired. The second ratchet member 37 can be configured to engage with the other of the sprocket support body 16 if needed or desired.

The first ratchet member 36 includes a second spline 38. The second spline 38 is configured to engage with the first spline 34. The second spline 38 includes at least one second spline tooth 38A. In the present embodiment, the second spline 38 includes at least two second spline teeth 38A. However, the total number of the at least one second spline tooth 38A is not limited to the illustrated embodiment.

As seen in FIG. 9, the first spline 34 and the second spline 38 are engaged to transmit a rotational force between the sprocket support body 16 and the first ratchet member 36. The at least one first spline tooth 34A and the at least one second spline tooth 38A mesh to transmit the rotational force between the sprocket support body 16 and the first ratchet member 36. The at least two first spline teeth 34A and the at least two second spline teeth 38A mesh to transmit the rotational force between the sprocket support body 16 and the first ratchet member 36.

The first ratchet member 36 includes a first base portion 36A. For example, the first base portion 36A has an annular shape. The second spline 38 is provided radially inwardly of the first base portion 36A. The at least one second spline tooth 38A extends radially inwardly of the first base portion 36A. The at least two second spline teeth 38A extend radially inwardly of the first base portion 36A. The shape of the first base portion 36A is not limited to the illustrated embodiment.

As seen in FIG. 8, the second ratchet member 37 includes at least one second tooth 42. In the present embodiment, the second ratchet member 37 includes at least two second teeth 42. However, the total number of the at least one second tooth 42 is not limited to the illustrated embodiment.

As seen in FIG. 9, the second ratchet member 37 includes a second base portion 37A. For example, the second base portion 37A has an annular shape. The at least one second tooth 42 extends radially outwardly of the second base portion 37A. The at least two second teeth 42 extends radially outwardly of the second base portion 37A. The shape of the second base portion 37A is not limited to the illustrated embodiment.

The at least one second tooth 42 is configured to engage with the at least one first tooth 30. The at least one first tooth 30 and the at least one second tooth 42 mesh to transmit a rotational force between the hub shell 14 and the second ratchet member 37. The at least two second teeth 42 are configured to engage with the at least two first teeth 30. The at least two first teeth 30 and the at least two second teeth 42 mesh to transmit the rotational force between the hub shell 14 and the second ratchet member 37.

Figure 10:
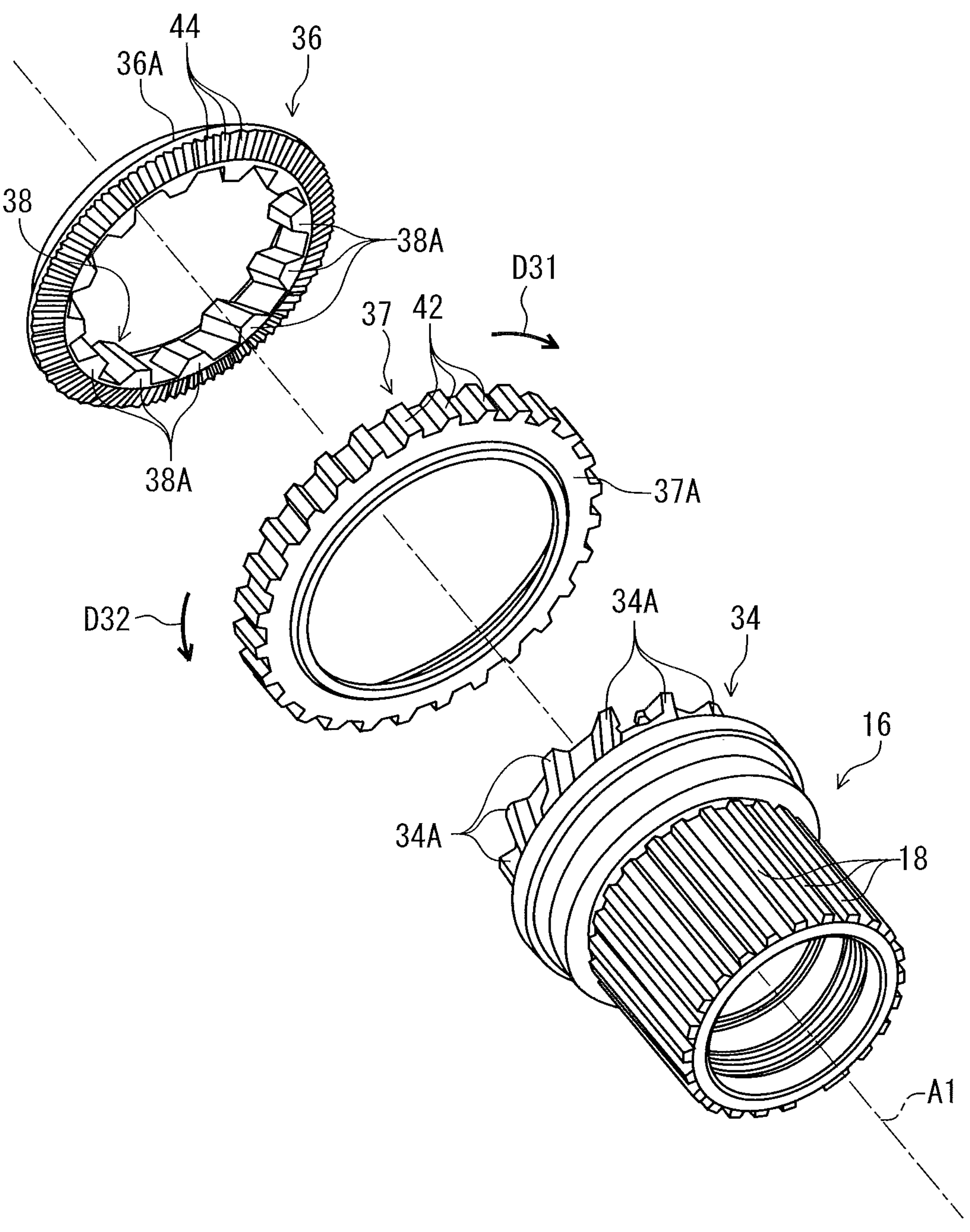
FIG. 10 is an exploded perspective view of a part of the hub assembly illustrated in FIG. 1.

As seen in FIG. 10, the first ratchet member 36 includes at least one first ratchet tooth 44. The at least one first ratchet tooth 44 protrudes from the first base portion 36A toward the second ratchet member 37. In the present embodiment, the first ratchet member 36 includes at least two first ratchet teeth 44. The at least two first ratchet teeth 44 protrude from the first base portion 36A toward the second ratchet member 37. However, the total number of the at least one first ratchet tooth 44 is not limited to the illustrated embodiment.

Figure 11:
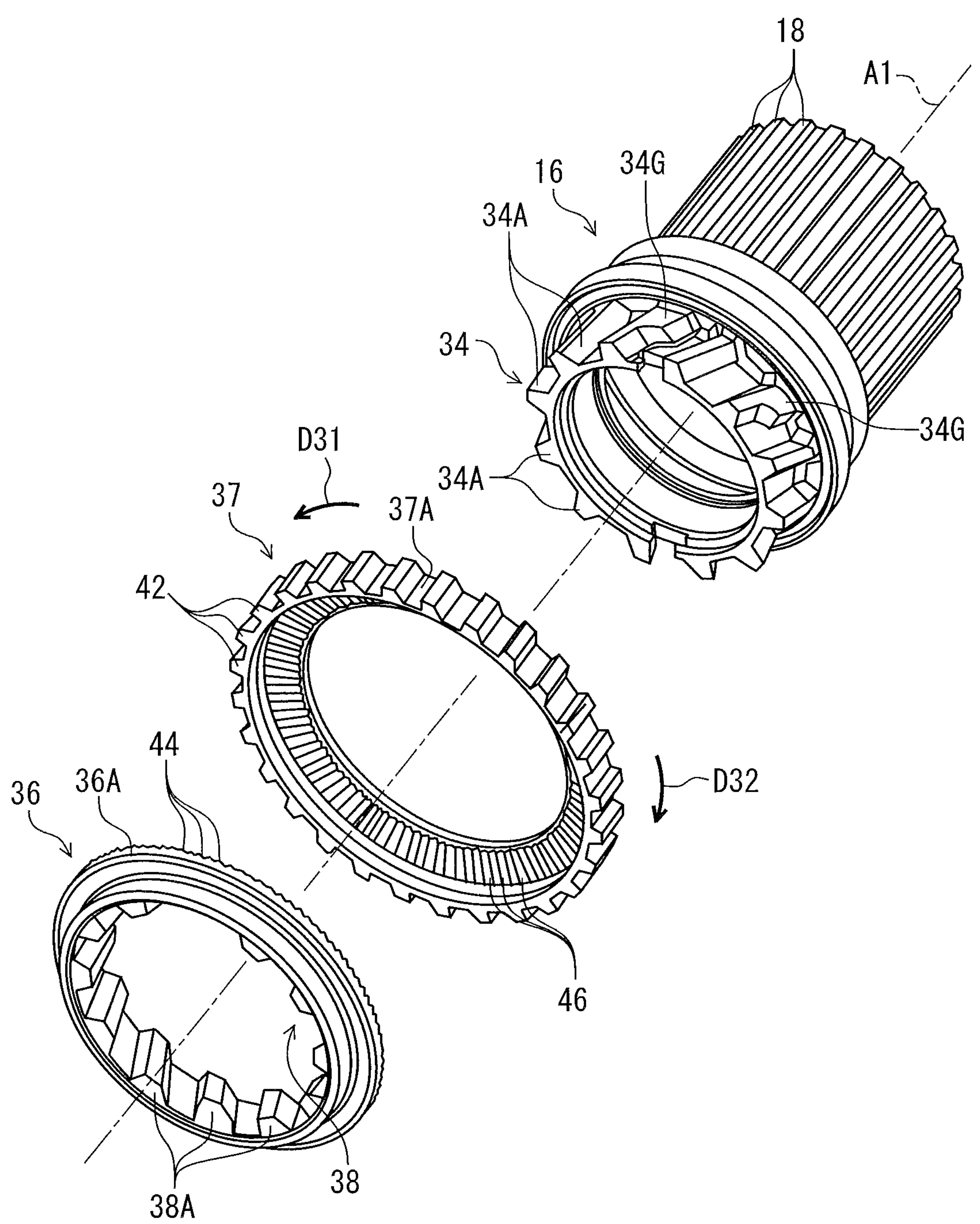
FIG. 11 is an exploded perspective view of a part of the hub assembly illustrated in FIG. 1.

As seen in FIG. 11, the second ratchet member 37 includes at least one second ratchet tooth 46. The at least one second ratchet tooth 46 protrudes from the second base portion 37A toward the first ratchet member 36. In the present embodiment, the second ratchet member 37 includes at least two second ratchet teeth 46. The at least two second ratchet teeth 46 protrude from the second base portion 37A toward the first ratchet member 36. However, the total number of the at least one second ratchet tooth 46 is not limited to the illustrated embodiment.

As seen in FIG. 6, the at least one second ratchet tooth 46 is configured to engage with the at least one first ratchet tooth 44. The at least one first ratchet tooth 44 and the at least one second ratchet tooth 46 are configured to mesh to transmit a rotational force between the first ratchet member 36 and the second ratchet member 37. The at least two second ratchet teeth 46 are configured to engage with the at least two first ratchet teeth 44. The at least two first ratchet teeth 44 and the at least two second ratchet teeth 46 are configured to mesh to transmit the rotational force between the first ratchet member 36 and the second ratchet member 37.

The one-way clutch structure 28 includes a biasing member 47. Namely, the hub assembly 10 for the human powered vehicle 2 comprises the biasing member 47. The biasing member 47 is provided between the hub shell 14 and the first ratchet member 36 in the axial direction D1 to bias the first ratchet member 36 toward the second ratchet member 37 in the axial direction D1. The axial direction D1 includes a first axial direction D11 and a second axial direction D12. The second axial direction D12 is an opposite direction of the first axial direction D11. The biasing member 47 is configured to bias the first ratchet member 36 toward the second ratchet member 37 in the first axial direction D11. In the present embodiment, the biasing member 47 includes a spring. However, the biasing member 47 can include another member other than the spring if needed or desired.

The hub assembly 10 for the human powered vehicle 2 comprises a receiving member 48. The receiving member 48 is provided between the first ratchet member 36 and the biasing member 47 in the axial direction D1. The receiving member 48 is pressed against the first ratchet member 36 by the biasing member 47. The receiving member 48 is in slidable contact with the first ratchet member 36.

Figure 12:
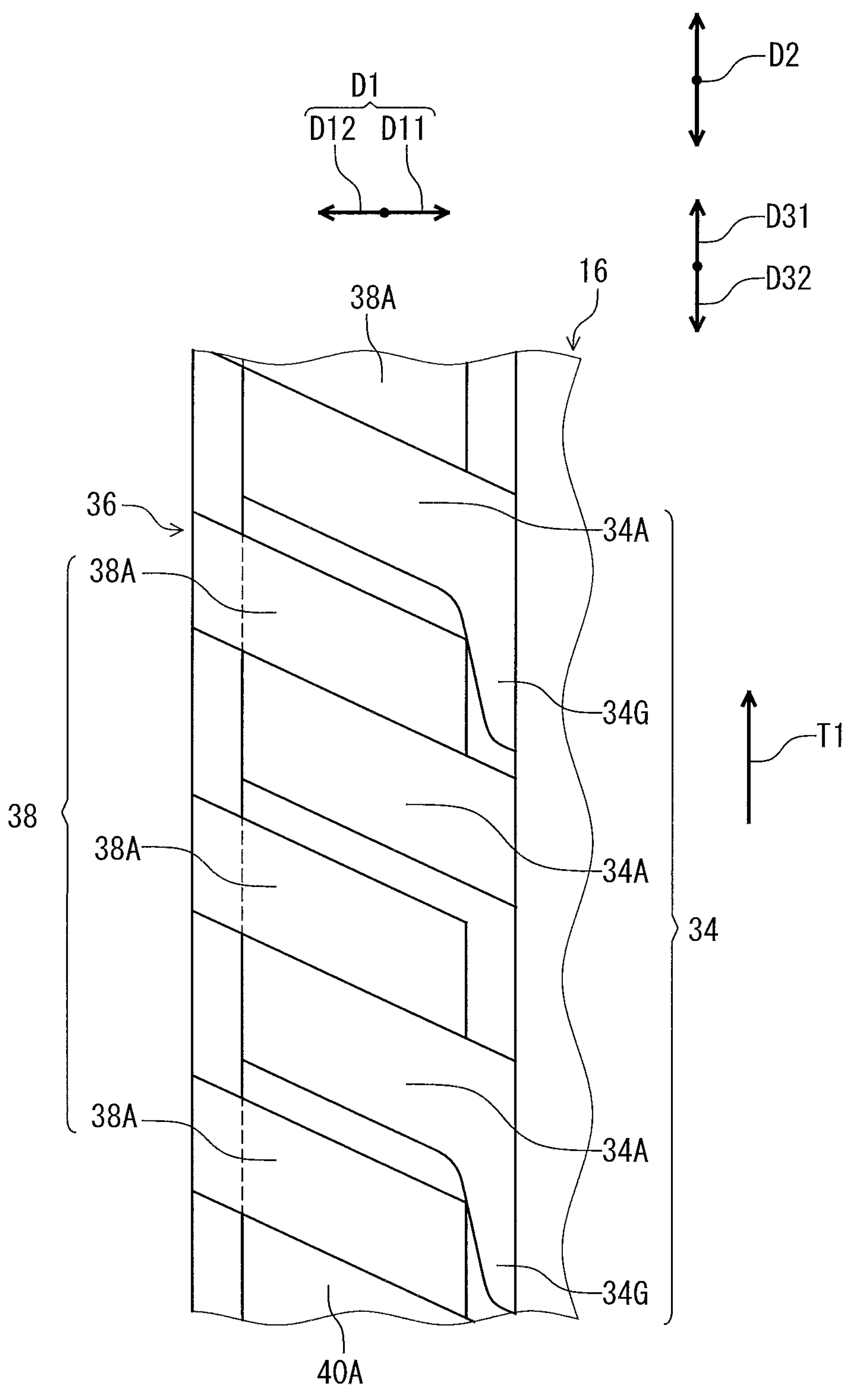
FIG. 12 is a schematic diagram showing an action of a first ratchet member and a sprocket support body of the hub assembly illustrated in FIG. 1 (pedaling).

As seen in FIG. 12, the first spline 34 includes a helical spline. The second spline 38 includes a helical spline. The first spline tooth 34A has a helical shape. The second spline tooth 38A has a helical shape. When the pedaling torque T1 is input to the sprocket support body 16 in the first rotational direction D31, the at least one second spline tooth 38A is guided by the at least one first spline tooth 34A relative to the sprocket support body 16 in the first axial direction D11. As seen in FIG. 6, this strongly brings the at least two first ratchet teeth 44 into engagement with the at least two second ratchet teeth 46. In this state, the pedaling torque T1 (see e.g., FIG. 12) is transmitted from the sprocket support body 16 to the hub shell 14 (FIG. 6) via the first ratchet member 36 and the second ratchet member 37 (FIG. 6).

Figure 13:
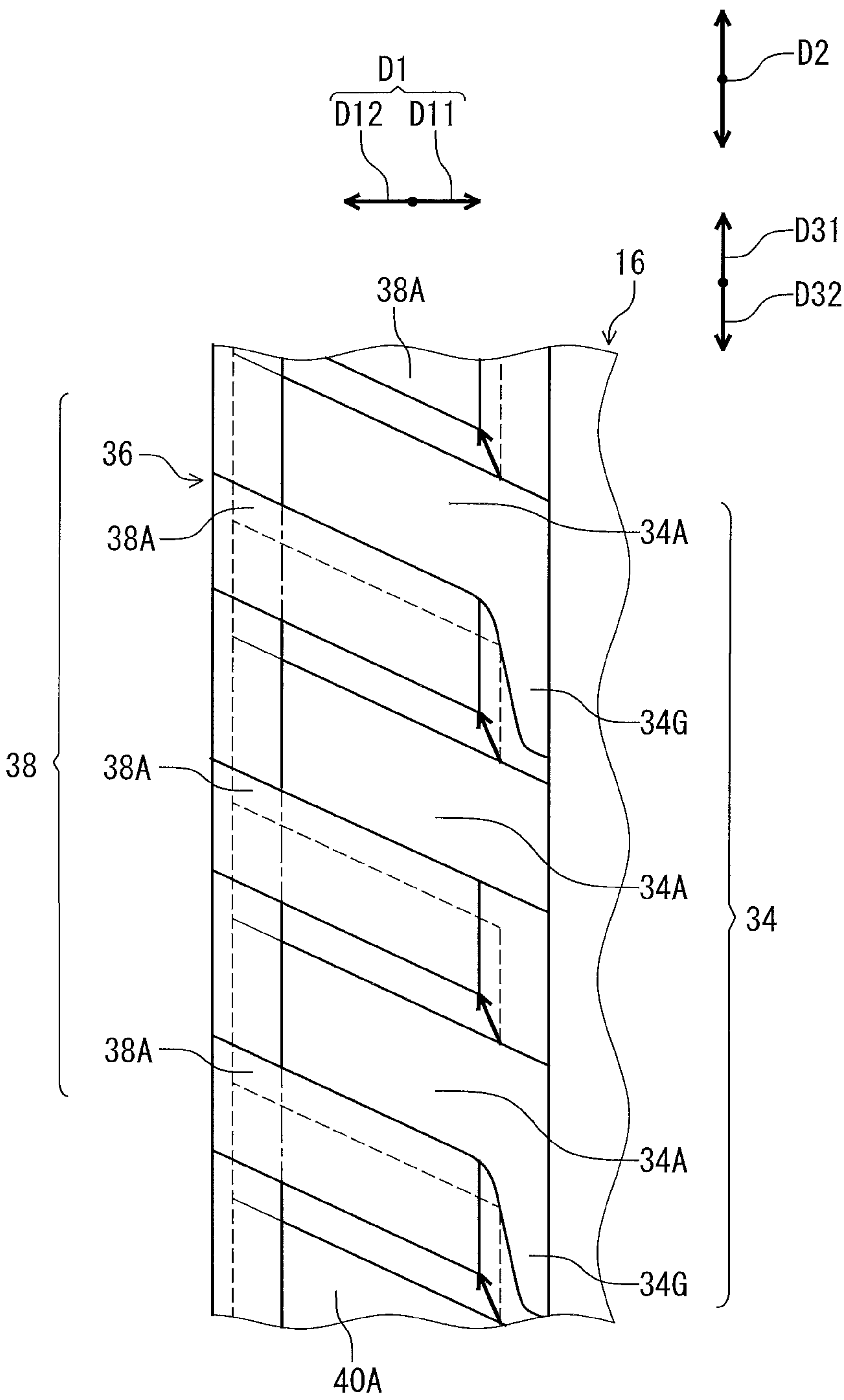
FIG. 13 is a schematic diagram showing an action of a first ratchet member and a sprocket support body of the hub assembly illustrated in FIG. 1 (coasting).

As seen in FIG. 13, the first spline 34 includes at least one guiding portion 34G. The guiding portion 34G extends from one of the at least one first spline tooth 34A in at least the circumferential direction D2. The at least one guiding portion 34G is configured to move the first ratchet member 36 away from the second ratchet member 37 in the second axial direction D12 during coasting or freewheeling. The at least one guiding portion 34G is configured to move the first ratchet member 36 against the biasing force of the biasing member 47 during coasting or freewheeling. As seen in FIG. 8, this allows the hub shell 14 and the second ratchet member 37 to rotate relative to the sprocket support body 16 and the first ratchet member 36 in the first rotational direction D31.

Rotation of the sprocket support body 16 and the sprocket assembly 4 are stopped during coasting since rotation of a crank is stopped while the human powered vehicle 2 travels forward. A wheel coupled to the hub shell 14 rotates in the first rotational direction D31 while the rotation of the sprocket support body 16 and the sprocket assembly 4 are stopped during coasting. When the hub shell 14 rotates relative to the sprocket support body 16 in the first rotational direction D31, the at least one guiding portion 34G and the at least one first spline tooth 34A guide the at least one second spline tooth 38A in the second axial direction D12. Thus, the first ratchet member 36 is moved relative to the second ratchet member 37 in the second axial direction D12 during coasting against the biasing force of the biasing member 47, reducing the engagement between the first ratchet teeth 44 and the second ratchet teeth 56. This allows the second ratchet member 37 to rotate relative to the first ratchet member 36 in the first rotational direction D31 while the at least one first ratchet tooth 44 of the first ratchet member 36 slides with the at least one second ratchet tooth 46 of the second ratchet member 37. Thus, the hub shell 14 is rotatable relative to the sprocket support body 16 in the first rotational direction D31 during coasting.

As seen in FIG. 11, in the present embodiment, the guiding portion 34G is integrally provided with the first spline tooth 34A as a one-piece unitary member. However, the guiding portion 34G can be a separate member from the first spline tooth 34A if needed or desired.

Figure 14:
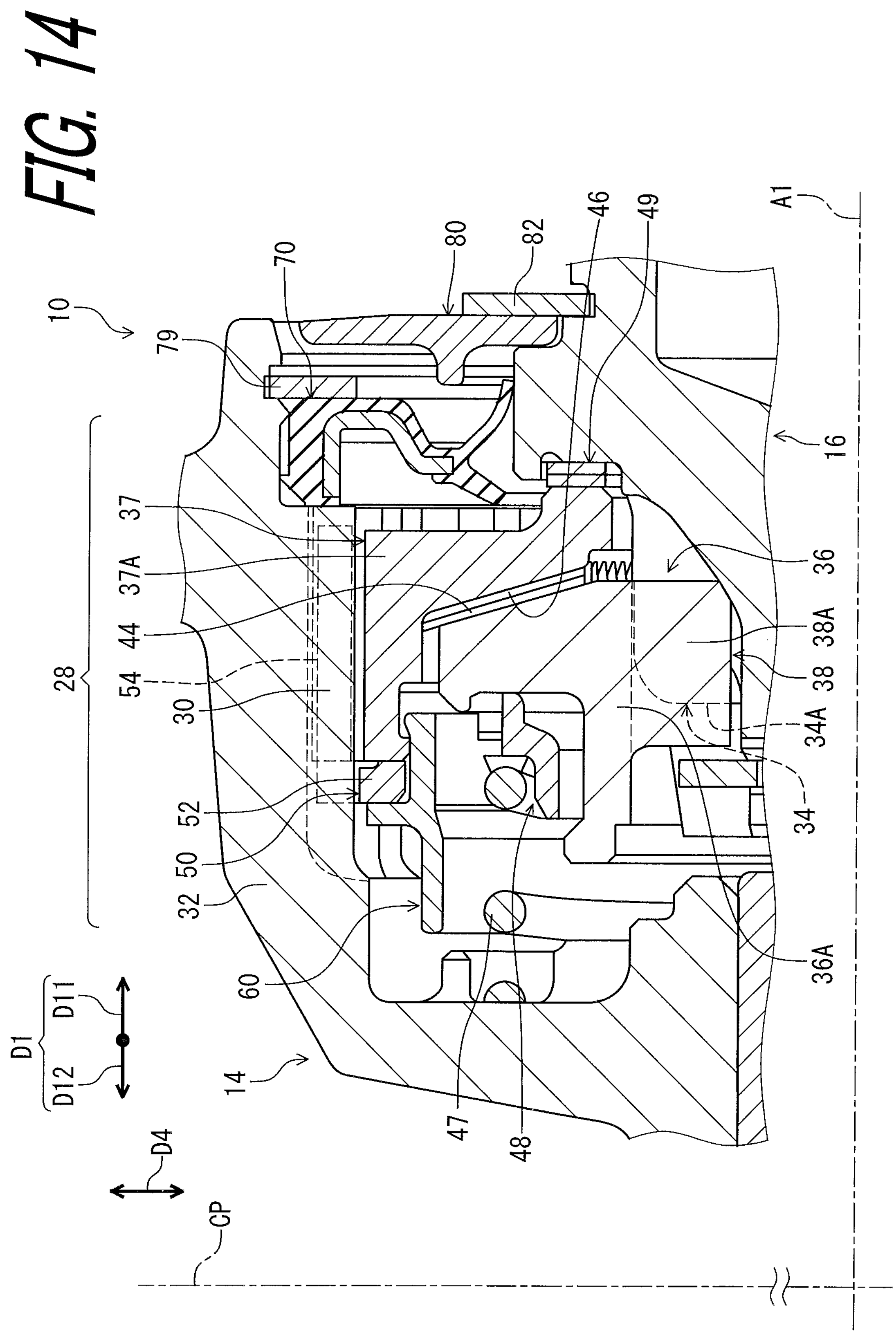
FIG. 14 is an enlarged cross-sectional view of the hub assembly taken along line XIV-XIV of FIG. 1.

As seen in FIG. 14, the hub assembly 10 includes a friction member 49. The friction member 49 is provided between the second ratchet member 37 and the sprocket support body 16. The friction member 49 is in slidable contact with the second ratchet member 37 and the sprocket support body 16. The biasing member 47 is configured to bias the receiving member 48, the first ratchet member 36, the second ratchet member 37, and the friction member 49 toward the sprocket support body 16 in the axial direction D1.

The hub assembly 10 for the human powered vehicle comprises a spacer 50. The spacer 50 includes at least one base member 52 and at least one axial projection 54. The at least one base member 52 extends in the circumferential direction D2. The at least one axial projection 54 extends from the at least one base member 52 in the axial direction D1.

In the present embodiment, the spacer 50 includes a base member 52 and at least two axial projections 54. The base member 52 has an annular shape. The at least two axial projections 54 extend from the base member 52 in the axial direction D1. However, the total number of the at least one base member 52 is not limited to the illustrated embodiment.

The total number of the at least one axial projection 54 is not limited to the illustrated embodiment. The spacer 50 can include at least two base members 52 arranged circumferential about the center axis A1 if needed or desired. In such modifications, for example, each of the at least two base members 52 has an arc shape.

As seen in FIG. 8, the at least one axial projection 54 is at least partially provided between the at least one first tooth 30 and the at least one second tooth 42 in the circumferential direction D2. The axial projection 54 is at least partially provided between the first tooth 30 and the second tooth 42 in the circumferential direction D2. The axial projection 54 is entirely provided between the first tooth 30 and the second tooth 42 in the circumferential direction D2. However, the axial projection 54 can be partially provided between the first tooth 30 and the second tooth 42 in the circumferential direction D2 if needed or desired.

In the present embodiment, the spacer 50 is made of a non-metallic material. The spacer 50 is made of a resin material. However, the spacer 50 can be made of a material other than resin material if needed or desired. The spacer 50 can be omitted from the hub assembly 10 if needed or desired.

As seen in FIG. 14, the hub assembly 10 further comprises a supporting member 60. The supporting member 60 is configured to push the spacer 50 toward the second ratchet member 37 in the axial direction D1. The supporting member 60 is coupled to the second ratchet member 37 to restrict the spacer 50 from moving relative to the second ratchet member 37 in the axial direction D1.

The hub assembly 10 for the human powered vehicle 2 comprises a seal member 70. The hub assembly 10 for the human powered vehicle 2 comprises a stopper 79. The stopper 79 is coupled to the hub shell 14 to hold the seal member 70 between the hub shell 14 and the stopper 79. The stopper 79 is detachably and reattachably coupled to the hub shell 14.

The hub assembly 10 further comprises a dust cover 80. The dust cover 80 is configured to be mounted to the sprocket support body 16. The hub assembly 10 further comprises a cover stopper 82. The cover stopper 82 is coupled to the sprocket support body 16 to hold the dust cover 80 between the sprocket support body 16 and the cover stopper 82. The cover stopper 82 is detachably and reattachably coupled to the sprocket support body 16.

The one-way clutch structure 28 can have another structure other than the structure illustrated in FIGS. 6 to 13.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or at least two parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hub assembly for a human powered vehicle, the hub assembly comprising:

a hub axle having a center axis defining an axial direction, a radial direction and a circumferential direction;

a hub shell rotatably mounted on the hub axle to rotate about the center axis;

a sprocket support body rotatably mounted on the hub axle to rotate about the center axis, the sprocket support body being configured to support at least one sprocket;

a first bearing unit disposed between the hub axle and the hub shell in the radial direction;

a second bearing unit disposed between the hub axle and the sprocket support body in the radial direction;

a sleeve mounted on the hub axle and extending in the axial direction, the sleeve being contactable with the hub axle in the radial direction;

the first bearing unit including:

a first inner race coupled to the hub axle;

a first outer race coupled to the hub shell; and at least two first rolling members disposed between the first inner race and the first outer race in the radial direction;

the second bearing unit including:

a second inner race coupled to the hub axle;

a second outer race coupled to the sprocket support body; and at least two second rolling members disposed between the second inner race and the second outer race in the radial direction;

the sleeve including:

a first abutment portion abutting the first inner race; and a second abutment portion abutting the second inner race in the radial direction, the first abutment portion being at least partially positioned radially outwardly from the second abutment portion in the radial direction, and the sleeve being free of radial abutment with the first inner race.

2. The hub assembly according to claim 1, wherein the first abutment portion of the sleeve abuts the first inner race in the axial direction.

3. The hub assembly according to claim 1, further comprising:

a third bearing unit disposed between the hub axle and the sprocket support body in the radial direction, wherein the third bearing unit includes:

a third inner race coupled to the hub axle;

a third outer race coupled to the sprocket support body; and at least two third rolling members disposed between the third inner race and the third outer race in the radial direction, and the sleeve further comprises a third abutment portion abutting the third inner race.

4. The hub assembly according to claim 3, wherein the third abutment portion of the sleeve abuts the third inner race in the axial direction.

5. The hub assembly according to claim 3, wherein the sleeve includes a first axial end and a second axial end opposite to the first axial end in the axial direction, the first axial end includes the first abutment portion, and the second axial end includes the third abutment portion.

6. The hub assembly according to claim 5, wherein the first axial end is positioned closer to an axial center plane of the hub assembly than the second axial end in the axial direction.

7. The hub assembly according to claim 1, wherein the sleeve is made of a metallic material.

8. The hub assembly according to claim 1, further comprising:

a one-way clutch structure disposed radially outwardly from the second bearing unit in the radial direction.

9. The hub assembly according to claim 8, wherein the one-way clutch structure includes:

a first ratchet member configured to engage with one of the hub shell and the sprocket support body; and a second ratchet member configured to engage with the other of the hub shell and the sprocket support body; and one of the first ratchet member and the second ratchet member is configured to be movable relative to the other of the first ratchet member and the second ratchet member in the axial direction.

10. A hub assembly for a human powered vehicle, the hub assembly comprising:

a hub axle having a center axis defining an axial direction, a radial direction and a circumferential direction;

a hub shell rotatably mounted on the hub axle to rotate about the center axis;

a sprocket support body rotatably mounted on the hub axle to rotate about the center axis, the sprocket support body being configured to support at least one sprocket;

an axially-outward bearing unit disposed between the hub axle and the sprocket support body in the radial direction;

an axially-inward bearing unit disposed between the hub axle and the sprocket support body in the radial direction, the axially-inward bearing unit being disposed closer to an axial center plane of the hub assembly in the axial direction than the axially-outward bearing unit;

a sleeve mounted on the hub axle and extending in the axial direction, the sleeve being contactable with the hub axle in the radial direction; and a one-way clutch structure disposed radially outwardly from the axially-inward bearing unit in the radial direction;

the axially-outward bearing unit including:

an axially-outward inner race coupled to the hub axle;

an axially-outward outer race coupled to the sprocket support body; and at least two axially-outward rolling members disposed between the axially-outward inner race and the axially-outward outer race in the radial direction;

the axially-inward bearing unit including:

an axially-inward inner race coupled to the hub axle;

an axially-inward outer race coupled to the sprocket support body; and at least two axially-inward rolling members disposed between the axially-inward inner race and the axially-inward outer race in the radial direction;

the sleeve including:

an axial abutment portion abutting the axially-outward inner race in the axial direction; and a radial abutment portion abutting the axially-inward inner race in the radial direction;

the sleeve being free of radial abutment with the axially-outward inner race with respect to the center axis; and the one-way clutch structure at least partially overlaps the axially-inward bearing unit in the radial direction.

11. The hub assembly according to claim 10, wherein the sleeve is made of a metallic material.

12. The hub assembly according to claim 10, wherein the one-way clutch structure is entirely radially outward from the axially-inward bearing unit in the radial direction.

13. A hub assembly for a human powered vehicle, the hub assembly comprising:

a hub axle having a center axis defining an axial direction, a radial direction and a circumferential direction;

a hub shell rotatably mounted on the hub axle to rotate about the center axis;

a sprocket support body rotatably mounted on the hub axle to rotate about the center axis, the sprocket support body being configured to support at least one sprocket;

an axially-outward bearing unit disposed between the hub axle and the sprocket support body in the radial direction;

an axially-inward bearing unit disposed between the hub axle and the sprocket support body in the radial direction, the axially-inward bearing unit being disposed closer to an axial center plane of the hub assembly in the axial direction than the axially-outward bearing unit;

a sleeve mounted on the hub axle and extending in the axial direction, the sleeve being contactable with the hub axle in the radial direction; and a one-way clutch structure disposed radially outwardly from the axially-inward bearing unit in the radial direction;

the axially-outward bearing unit including:

an axially-outward inner race coupled to the hub axle;

an axially-outward outer race coupled to the sprocket support body; and at least two axially-outward rolling members disposed between the axially-outward inner race and the axially-outward outer race in the radial direction;

the axially-inward bearing unit including:

an axially-inward inner race coupled to the hub axle;

an axially-inward outer race coupled to the sprocket support body; and at least two axially-inward rolling members disposed between the axially-inward inner race and the axially-inward outer race in the radial direction;

the sleeve including:

an axial abutment portion abutting the axially-outward inner race in the axial direction; and a radial abutment portion abutting the axially-inward inner race in the radial direction;

the sleeve being free of radial abutment with the axially-outward inner race with respect to the center axis, wherein the one-way clutch structure includes:

a first ratchet member configured to engage with one of the hub shell and the sprocket support body; and a second ratchet member configured to engage with the other of the hub shell and the sprocket support body; and one of the first ratchet member and the second ratchet member is configured to be movable relative to the other of the first ratchet member and the second ratchet member in the axial direction.

14. A hub assembly for a human powered vehicle, the hub assembly comprising:

a hub axle having a center axis defining an axial direction, a radial direction and a circumferential direction;

a hub shell rotatably mounted on the hub axle to rotate about the center axis;

a sprocket support body rotatably mounted on the hub axle to rotate about the center axis, the sprocket support body being configured to support at least one sprocket;

an axially-outward bearing unit disposed between the hub axle and the sprocket support body in the radial direction;

an axially-inward bearing unit disposed between the hub axle and the sprocket support body in the radial direction, the axially-inward bearing unit being disposed closer to an axial center plane of the hub assembly in the axial direction than the axially-outward bearing unit;

a sleeve mounted on the hub axle and extending in the axial direction, the sleeve being contactable with the hub axle in the radial direction; and a one-way clutch structure disposed radially outwardly from the axially-inward bearing unit in the radial direction;

the axially-outward bearing unit including:

an axially-outward inner race coupled to the hub axle;

an axially-outward outer race coupled to the sprocket support body; and at least two axially-outward rolling members disposed between the axially-outward inner race and the axially-outward outer race in the radial direction, and the axially-inward bearing unit including:

an axially-inward inner race coupled to the hub axle;

an axially-inward outer race coupled to the sprocket support body; and at least two axially-inward rolling members disposed between the axially-inward inner race and the axially-inward outer race in the radial direction;

the sleeve including:

an axial abutment portion abutting the axially-outward inner race in the axial direction; and a radial abutment portion abutting the axially-inward inner race in the radial direction;

the sleeve being free of axial abutment with the axially-inward inner race with respect to the center axis; and the one-way clutch structure at least partially overlaps the axially-inward bearing unit in the radial direction.

15. The hub assembly according to claim 14, wherein the sleeve is free of radial abutment with the axially-outward inner race with respect to the center axis.

16. The hub assembly according to claim 14, wherein the sleeve is made of a metallic material.

17. The hub assembly according to claim 14, wherein the one-way clutch structure is entirely radially outward from the axially-inward bearing unit in the radial direction.

18. A hub assembly for a human powered vehicle, the hub assembly comprising:

a hub axle having a center axis defining an axial direction, a radial direction and a circumferential direction;

a hub shell rotatably mounted on the hub axle to rotate about the center axis;

a sprocket support body rotatably mounted on the hub axle to rotate about the center axis, the sprocket support body being configured to support at least one sprocket;

an axially-outward bearing unit disposed between the hub axle and the sprocket support body in the radial direction;

an axially-inward bearing unit disposed between the hub axle and the sprocket support body in the radial direction, the axially-inward bearing unit being disposed closer to an axial center plane of the hub assembly in the axial direction than the axially-outward bearing unit;

a sleeve mounted on the hub axle and extending in the axial direction, the sleeve being contactable with the hub axle in the radial direction; and a one-way clutch structure disposed radially outwardly from the axially-inward bearing unit in the radial direction;

the axially-outward bearing unit including:

an axially-outward inner race coupled to the hub axle;

an axially-outward outer race coupled to the sprocket support body; and at least two axially-outward rolling members disposed between the axially-outward inner race and the axially-outward outer race in the radial direction, and the axially-inward bearing unit including:

an axially-inward inner race coupled to the hub axle;

an axially-inward outer race coupled to the sprocket support body; and at least two axially-inward rolling members disposed between the axially-inward inner race and the axially-inward outer race in the radial direction;

the sleeve including:

an axial abutment portion abutting the axially-outward inner race in the axial direction; and a radial abutment portion abutting the axially-inward inner race in the radial direction;

the sleeve being free of axial abutment with the axially-inward inner race with respect to the center axis, wherein the one-way clutch structure includes:

a first ratchet member configured to engage with one of the hub shell and the sprocket support body; and a second ratchet member configured to engage with the other of the hub shell and the sprocket support body; and one of the first ratchet member and the second ratchet member is configured to be movable relative to the other of the first ratchet member and the second ratchet member in the axial direction.

* * * * *